United States Patent
Kawakami et al.

(10) Patent No.: US 9,116,368 B2
(45) Date of Patent: Aug. 25, 2015

(54) OPTICAL MODULATION DEVICE AND BIAS VOLTAGE CONTROL METHOD

(75) Inventors: Hiroto Kawakami, Tokyo (JP); Eiji Yoshida, Tokyo (JP); Yutaka Miyamoto, Tokyo (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 0 days.

(21) Appl. No.: 14/122,687

(22) PCT Filed: Aug. 21, 2012

(86) PCT No.: PCT/JP2012/071096
§ 371 (c)(1),
(2), (4) Date: Nov. 27, 2013

(87) PCT Pub. No.: WO2013/027734
PCT Pub. Date: Feb. 28, 2013

(65) Prior Publication Data
US 2014/0153077 A1    Jun. 5, 2014

(30) Foreign Application Priority Data

Aug. 22, 2011 (JP) .................................. 2011-180928

(51) Int. Cl.
*G02F 1/01*      (2006.01)
*G02F 1/00*      (2006.01)
(Continued)

(52) U.S. Cl.
CPC ................ *G02F 1/0123* (2013.01); *G02F 1/21* (2013.01); *H04B 10/5053* (2013.01);
(Continued)

(58) Field of Classification Search
CPC ........... G02F 1/00; G02F 1/01; G02F 1/0123; G02F 1/03; G02F 1/07; G02F 1/21; G02F 1/225; G02F 1/2255; G02F 1/35; G02F 2001/212; G02F 2201/58; G02F 2203/21; H04B 10/505; H04B 10/5053; H04B 10/50572; H04B 10/50575; H04B 10/50577; H04B 10/506; H04B 10/541; H04B 10/548; H04B 10/5167; H04B 10/5561; H04L 27/3411; H04L 27/364

USPC ............ 359/237–239, 259, 276, 279; 398/48, 398/159, 182, 183, 188, 198; 385/15, 24
See application file for complete search history.

(56) References Cited

U.S. PATENT DOCUMENTS 7,327,913 B2 *   2/2008   Shpantzer et al. .............. 385/15
7,603,007 B2 *   10/2009  Terahara et al. ................ 385/24
(Continued)

FOREIGN PATENT DOCUMENTS

| JP | 2003032221 | 1/2003 |
| JP | 2008249848 | 10/2008 |

(Continued)

OTHER PUBLICATIONS

English translation of International Search Report dated Aug. 10, 2010 corresponding to PCT/JP2010/004490, 2 pp.
(Continued)

*Primary Examiner* — Loha Ben
(74) *Attorney, Agent, or Firm* — Ohlandt, Greeley, Ruggiero & Perle, L.L.P.

(57) ABSTRACT

An optical modulation device including: bias power supplies that output a signal having a bias voltage corresponding to the null point of an optical modulation unit to the optical modulation unit; and synchronous detection circuits that determine whether an intensity of a QAM signal at a drift non-occurrence time where no drift occurs in the bias voltage becomes larger or smaller than the intensity of the QAM signal at a drift occurrence time where a drift occurs in the bias voltage, adjust the bias voltage to maximize the intensity of the QAM signal when determining that the intensity of the QAM signal at the drift non-occurrence time becomes larger than the intensity of the QAM signal at the drift occurrence time, and adjust the bias voltage to minimize the intensity of the QAM signal when determining that the intensity of the QAM signal at the drift non-occurrence time becomes smaller than the intensity of the QAM signal at the drift occurrence time.

12 Claims, 17 Drawing Sheets

(51) Int. Cl.
- H04B 10/12 (2006.01)
- G02B 6/28 (2006.01)
- G02F 1/21 (2006.01)
- H04B 10/54 (2013.01)
- H04L 27/34 (2006.01)
- H04L 27/36 (2006.01)
- H04B 10/548 (2013.01)
- H04B 10/50 (2013.01)

(52) U.S. Cl.
CPC ....... H04B 10/50575 (2013.01); H04B 10/541 (2013.01); H04L 27/3411 (2013.01); H04L 27/364 (2013.01); G02B 6/28 (2013.01); G02F 2001/212 (2013.01); H04B 10/50595 (2013.01); H04B 10/548 (2013.01)

(56) References Cited

U.S. PATENT DOCUMENTS

| | | | | |
|---|---|---|---|---|
| 7,876,491 B2 * | 1/2011 | Ide et al. | | 359/279 |
| 7,907,324 B2 * | 3/2011 | Hoshida et al. | | 359/279 |
| 7,978,390 B2 * | 7/2011 | Kikuchi | | 359/238 |
| 8,050,351 B2 * | 11/2011 | Cho et al. | | 375/295 |
| 8,072,669 B2 * | 12/2011 | Zhou | | 359/238 |
| 8,483,576 B2 * | 7/2013 | Yamashita et al. | | 398/188 |
| 8,965,146 B2 * | 2/2015 | Goh et al. | | 385/3 |
| 9,014,572 B2 * | 4/2015 | Akiyama | | 398/197 |
| 2012/0106888 A1 | 5/2012 | Goh et al. | | |
| 2012/0308240 A1 | 12/2012 | Akiyama | | |

FOREIGN PATENT DOCUMENTS

| | | |
|---|---|---|
| JP | 2009232060 | 10/2009 |
| JP | 2010243953 | 10/2010 |
| JP | 2011150052 | 8/2011 |
| WO | 2011004615 | 1/2011 |

OTHER PUBLICATIONS

Kawakami, et al., "Asymmetric dithering technique for bias condition monitoring in optical QPSK modulator", Electronic Letters, Mar. 18, 2010, vol. 46, No. 6.

International Preliminary Report on Patentability dated Mar. 6, 2014 corresponding to PCT/JP2012/071096, 2 pp.

Written Opinion of the International Searching Authority dated Oct. 9, 2012 corresponding to PCT/JP2012/071096, 3 pp.

Japanese Office Action dated Sep. 30, 2014 corresponding to Japanese Patent Application No. 2013-530025; 13 pages.

* cited by examiner

PRIOR ART

PRIOR ART

OPTICAL MODULATION DEVICE AND BIAS VOLTAGE CONTROL METHOD

BACKGROUND

1. Field of the Disclosure

The present disclosure relates to an automatic bias voltage control of an optical modulation device for use in multi Quadrature Amplitude Modulation (QAM). In particular, the present disclosure is suitable for the automatic bias voltage control of an optical modulation device that sends a quaternary or larger value QAM signal.

2. Discussion of the Background Art

As a transmission code for use in an optical transmission system, a QAM signal, capable of sending a large amount of optical signals at a low symbol rate has been paid attention. The simplest QAM is quaternary QAM and called Quadrature Phase Shift Keying (QPSK). The present disclosure is applicable to any multi-QAM modulators including QPSK, however for simplicity, a description will be mainly given of a 16 QAM system in the present disclosure. Here, some symbols have a bar placed on characters in figures, however placed before the characters indicates that the symbols have the bar on the characters in the specification.

FIG. 1 shows the configuration of an optical modulation device in the related art. A continuous optical signal input to an IQ optical modulator M is divided into two signals by a first optical coupler 1 and input to the first and second optical modulation units which are an I-component optical modulation unit 2 and a Q-component optical modulation unit 3 (hereinafter first and second optical modulation units 2 and 3, respectively). The first and second optical modulation units 2 and 3 are generally composed of Mach-Zehnder Interferometer (MZI) type optical modulators and have the function of relatively changing an optical phase and optical intensity corresponding to the logic of the first quaternary data signals Data1 and Data1 and that of second quaternary data signals Data2 and Data2. Here, the relationship between the optical phase and optical intensity with respect to the four values of the data signals will be described below. In addition, the first and second bias voltages applied to the first and second optical modulation units 2 and 3, respectively, will be described below.

After the addition of a phase difference $\theta_3$ by an optical phase shifter 4 having an orthogonal bias electrode 101 to which a third bias voltage to be described below is applied, the outputs of the first and second optical modulation units 2 and 3 are multiplexed by the second optical coupler 5 and output as a 16 optical QAM signal. If $\theta_3$ is $\pm\pi/2$, an ideal waveform can be obtained. It is equivalent to ¼ of a carrier wavelength, and general wavelength is of the order of micrometer, so then the adjustment must be performed really precisely. In addition, since the optical quality of an optical QAM signal is sensitive to an error in the optical phase shifter 4, it is really important to adjust the amount of phase shift induced by the optical phase shifter 4 to an appropriate value.

In general, this adjustment is made in such a manner that a third bias voltage (also called an orthogonal bias voltage) $V_{bias3}$ supplied from a third bias power supply 10 to the optical phase shifter 4 is adjusted. The optical phase shifter 4 is arranged on the rear stage of the second optical modulation unit 3 in FIG. 1, however it may be arranged on the rear stage of the first optical modulation unit 2, arranged on those of both the first and second optical modulation units 2 and 3, or arranged on the front stage. Hereinafter, for simplicity, it is assumed that the optical phase shifter 4 is arranged only on the rear stage of the second optical modulation unit 3.

Next, a description will be given of the relationship between the optical phase and optical intensity in the outputs of the first and second optical modulation units 2 and 3 with respect to the four values of the first and second quaternary data signals. As described above, it is general to use MZI type optical modulators as the first and second optical modulation units 2 and 3. The first and second optical modulation units 2 and 3 are driven by the first and second quaternary data signals, respectively. Each of these data signals is a quaternary NRZ Non Return-to-Zero (NRZ) signal. The first driving amplifier 6 amplifies the first quaternary data signal into the two complementary signals, and generates Data1 and Data1. The second driving amplifier 7 amplifies the second quaternary data signal into the two complementary signals, and generates Data2 and Data2.

The respective amplified quaternary data signals Data1 and Data1 are applied to the two arms of the first optical modulation unit 2 via a first driving electrode 61 to generate a phase shift $\pm\phi_1$. The respective amplified quaternary data signals Data2 and Data2 are applied to the two arms of the second optical modulation unit 3 via a second driving electrode 71 to generate a phase shift $\pm\phi_2$. The values of the phase delays $\phi_1$ and $\phi_2$ change with the four values of the respective data signals. In addition, DC voltages (data bias voltages) $V_{bias1}$ and $V'_{bias1}$ are generated by a first bias power supply 8, and optical phase shifts $+\theta_1$ and $-\theta'_1$ are further added via a first bias electrode 81. Moreover, DC voltages (data bias voltages) $V_{bias2}$ and $V'_{bias2}$ are generated by a second bias power supply 9, and optical phase shifts $+\theta_2$ and $-\theta'_2$ are further added via a second bias electrode 91.

Next, the expression of the various voltages described above is defined as follows. The four signal levels of a differential signal (Data1-Data1) generated by the first driving amplifier 6 are expressed as $V_0$, $V_1$, $-V_1$, and $-V_0$, and it is assumed that $V_0 > V_1 > -V_1 > -V_0$ is established. Since the optical characteristics of the first optical modulation unit 2 are generally the same as those of the second optical modulation unit 3, the four signal levels of a differential signal (Data2-Data2) generated by the second driving amplifier 7 are also expressed as $V_0$, $V_1$, $-V_1$, and $-V_0$.

$V_{bias1}$, $V'_{bias1}$, $V_{bias2}$, and $V'_{bias2}$ select the null points of the first and second optical modulation units 2 and 3. In other words, the output light of the first and second optical modulation units 2 and 3 is set to extinguish when the differential voltages of the signals generated by the first and second driving amplifiers 6 and 7 are 0. In addition, the maximum amplitudes of the differential outputs of the first and second driving amplifiers 6 and 7 are set so as not to exceed twice the half wavelength voltages $V_\pi$ of the first and second optical modulation units 2 and 3. Accordingly, $2V_\pi \geq V_0 - (-V_0) = 2V_0$ is established.

Here, a description will be given, with reference to FIG. 1, of the half wavelength voltage $V_\pi$ of the first optical modulation unit 2. The first optical modulation unit 2 is a MZI type modulator and incorporates two waveguides. It is assumed that a data bias is adjusted to extinguish the output of the first optical modulation unit 2 when both of the voltages Data1 and Data1 applied to the two waveguides are 0. In general, complementary driving signals are applied to the two waveguides, and $2V_x$ is called the half wavelength voltage $V_\pi$ of the first optical modulation unit 2 if the optical output of the first optical modulation unit 2 reaches maximum intensity under Data1=$V_x$ and Data1=$-V_x$. The optical output of the first optical modulation unit 2 reaches the maximum intensity even under Data1=$-V_x$ and Data1=$V_x$, however the optical phase of the optical output in this case is made different by $\pi$ compared with the former example. Since the first optical modulation unit 2 changes an optical phase by making use of the property, each of Data1 and Data1 is set to have an amplitude of $2V_x = V_\pi$ at the maximum and (Data1-Data1) is set to have an amplitude of $2V_\pi$ at the maximum. The second optical modulation unit 3 is configured in the same manner as the first optical modulation unit 2.

Here, in the IQ optical modulator M shown in FIG. 1, each of the driving signal electrodes is configured to apply positive and negative complementary voltages to the two waveguides, and thus four electrodes in total exist. The IQ optical modulator M of this type is called a dual drive type. On the other hand, a single drive type IQ optical modulator M has only two driving signal electrodes. In such a configuration, the first driving electrode 61 simultaneously applies electric fields to the two waveguides inside the first optical modulation unit 2, and the second driving electrode 71 simultaneously applies electric fields to the two waveguides inside the second optical modulation unit 3. With the anisotropy of the four waveguides, the single drive type IQ optical modulator M can realize the same function as that of the dual drive type. Also in this configuration, the quaternary data signals applied to the first and second driving electrodes 61 and 71 are the four voltages $V_0, V_1, -V_1,$ and $-V_0$, and the amplitude of each of the driving signals is set so as not to exceed twice the half wavelength voltage $V_\pi$.

FIG. 2 shows the characteristics of the optical modulation device in a case in which no bias drift occurs. FIG. 2 shows the relationship between the electric field $E_1$ of the output light of the first optical modulation unit 2 and $V_0, V_1, -V_1, -V_0,$ and $V_{bias1}$, and the relationship between the electric field $E_2$ of the output light of the second optical modulation unit 3 and $V_0, V_1, -V_1, -V_0,$ and $V_{bias2}$ is also expressed just like FIG. 2. When the sum of the potentials $V_0, V_1, -V_1,$ and $-V_0$ of a driving signal and the data bias $V_{bias1}$ is shown in the horizontal axis and the electric field $E_1$ of the output light is shown in the vertical axis, a sine wave is drawn. When the optimum data bias is applied, $V_0, V_1, -V_1,$ and $-V_0$ are arranged symmetrically to the null point and the electric fields $E_{11}, E_{12}, E_{13},$ and $E_{14}$ of the output light generated by $V_0, V_1, -V_1,$ and $-V_0$ are also arranged symmetrically to the 0 level.

FIG. 3 shows a constellation in a case in which no bias drift occurs. Since $\theta_3 = \pi/2$ is established when optimum $V_{bias3}$ is applied to the optical phase shifter 4 and the optical phase of the output light of the first optical modulation unit 2 and that of the second optical modulation unit 3 are kept to be orthogonal to each other, the constellation of the output light of the IQ optical modulator M is one having a lattice pattern as shown in FIG. 3. Here, it is important that the respective symbols of the constellation are arranged symmetrically to the origin. This symmetry is a property common to QAM in addition to 16QAM. Here, since $E_1$ and $E_2$ are orthogonal to each other when $\theta_3 = \pi/2$ is kept, an In-Phase component and a Quadrarure-Phase component are sometimes briefly called an I-component and a Q-component, respectively.

The optical power $P_{total}$ of a 16QAM signal is proportional to the sum of the square of the electric field of each of the symbols of the constellation. $P_{total}$ is expressed by Equation 1.

$$P_{total} \propto \Sigma(|E_{1K}|^2 + |E_{2L}|^2) \qquad \text{(Equation 1)}$$

Here, K and L have the sum of 1 to 4.

In a case in which $V_{bias1}$ and $V_{bias2}$ are kept at optimum values even if a bias drift occurs in $V_{bias3}$ and $\theta_3$ has a value different from $\pi/2$, the total of the optical power $P_{total}$ does not change as described in detail in Non-Patent Literature 1. Therefore, it is relatively difficult to detect a drift occurring in $V_{bias3}$. However, it becomes possible to detect a drift occurring in $V_{bias3}$ with the application of dithering to $V_{bias1}$ and $V_{bias2}$ using the technique of asymmetric bias dithering described in Non-Patent Literature 1.

Next, consideration will be given to a case in which a bias drift occurs in the data bias $V_{bias1}$ or $V_{bias2}$. In the case of quaternary QAM, i.e., a QPSK signal, since the optical power of modulation light immediately decreases after a bias drift occurs in the data bias $V_{bias1}$ or $V_{bias2}$, it is relatively easy to detect the bias drift occurring in the data bias $V_{bias1}$ or $V_{bias2}$. Thus, it becomes possible to detect and correct bias drifts occurring in all the $V_{bias1}, V_{bias2},$ and $V_{bias3}$ of the QPSK modulator with the technique of the asymmetric bias dithering described above.

CITATION LIST

Non-Patent Literature

Non-Patent Literature 1: H. Kawakami, E. Yoshida and Y. Miyamoto, "Asymmetric dithering technique for bias condition monitoring in optical QPSK modulator," Electronics Letters (2010), vol.46, no.6, pp.430-431

However, in the case of a quaternary or higher order QAM signal, the number of symbols in the constellation increases, which causes other problems not seen in QPSK.

FIG. 4 shows the characteristics of the optical modulation device in a case in which a bias drift occurs. Since the optical characteristics of the optical modulation device are affected by the bias drift, the curve of the sine wave shown in FIG. 2 shifts rightward or leftward as a whole. FIG. 4 shows a case in which the curve of the sine wave shifts rightward. The four values of $E_1$ shift from the positions of large white circles to those of large black circles. The absolute value of $E_{13}$ increases, on the contrary that of $E_{12}$ decreases. The absolute value of $E_{14}$ increases on the contrary that of $E_{11}$ decreases, though these shifts are smaller than those of $E_{12}$ and $E_{13}$.

FIG. 5 shows a constellation in a case in which a bias drift occurs. For simplicity, it is assumed that a drift occurs only in $V_{bias1}$ and no drift occurs in other biases ($V_{bias2}$ and $V_{bias3}$). Some symbols (which are satisfying $E_1 = E_{13}$) are distant from the origin, while other symbols (which are satisfying $E_1 = E_{12}$) are close to the origin. For this reason, it is not certain whether the optical power $P_{total}$ increases or decreases.

FIG. 6 shows an example of the relationship between the drift of the bias voltage and the intensity of the optical signal. The horizontal axis expresses drift amounts of $V_{bias1}$, normalized by $V_\pi$ of the first optical modulation unit 2. It means that, $-0.5$ in the horizontal axis expresses that $V_{bias1}$ decreases by $0.5\,V_\pi$ from an optimum voltage. Here, it is assumed that $V_0 - V_1 = V_1 - (-V_1)$ is established and the four signal levels of the differential signal (Data1-Data1) generated by the first driving amplifier 6 are arranged at even intervals. Of the two curves shown in FIG. 6, one shows $V_0 - V_1 = V_1 - (-V_1) = 0.6\,V_\pi$ and the other shows $V_0 - V_1 = V_1 - (-V_1) = 0.4\,V_\pi$. $P_{total}$ becomes maximum when $V_{bias1}$ is optimum in the former case, however $P_{total}$ becomes minimum when $V_{bias1}$ is optimum in the latter case.

FIG. 7 shows another example of the relationship between the drift of the bias voltage and the intensity of the optical signal. Here, it is assumed that pre-emphasis is applied to $V_0$ and $V_1$ and Equation 2 is established.

$$\sin(V_0/V_\pi \times \pi/2) - \sin(V_1/V_\pi \times \pi/2) = \sin(V_1/V_\pi \times \pi/2) - \sin(-V_1/V_\pi \times \pi/2) \qquad \text{(Equation 2)}$$

In the case of FIG. 6, $V_0, V_1, -V_1,$ and $-V_0$ are arranged at even intervals, however $E_{11}, E_{12}, E_{13},$ and $E_{14}$ are not arranged at even intervals, because of the nonlinear characteristics of the first optical modulation unit 2. In the case of FIG. 7, a more ideal constellation can be obtained since $E_{11}$, $E_{12}$, $E_{13}$, and $E_{14}$ are arranged at even intervals by utilizing the pre-emphasis.

Of the two curves shown in FIG. 7, one establishes Equation 3, $$\sin(V_0/V_\pi \times \pi/2) - \sin(V_1/V_\pi \times \pi/2) = \sin(V_1/V_\pi \times \pi/2) - \sin(-V_1/V_\pi \times \pi/2) = 0.63 \quad \text{(Equation 3)}$$

and the other establishes Equation 4.

$$\sin(V_0/V_\pi \times \pi/2) - \sin(V_1/V_\pi \times \pi/2) = \sin(V_1/V_\pi \times \pi/2) - \sin(-V_1/V_\pi \times \pi/2) = 0.60 \quad \text{(Equation 4)}$$

$P_{total}$ becomes maximum when $V_{bias1}$ is optimum in the former case, however $P_{total}$ becomes minimum when $V_{bias1}$ is optimum in the latter case.

In a case in which $V_{bias1}$ and $V_{bias2}$ are controlled while monitoring the optical power of a multi-QAM signal with a low speed optical power monitor, it is required to appropriately select whether to maximize or minimize the optical power in consideration of the amplitude of a driving signal and the half wavelength voltage of an optical modulation unit.

Accordingly, in order to solve the above problems, it is an object of the present disclosure to provide a technique for appropriately selecting whether to maximize or minimize an optical power in automatically controlling the bias voltage of an optical modulator.

SUMMARY

To this end, the present disclosure appropriately selects whether to maximize or minimize an optical power in consideration of the amplitude of a driving signal and the half wavelength voltage of an optical modulation unit in automatically controlling the bias voltage of an optical modulator.

The present disclosure provides an optical modulation device, including:

an I-component optical modulation unit that modulates a continuous optical signal for an I-component of a QAM signal;

a Q-component optical modulation unit that modulates a continuous optical signal for a Q-component of the QAM signal;

a phase shift unit that shifts a phase of an optical signal on an input side and/or an output side for the I-component optical modulation unit and/or the Q-component optical modulation unit to adjust a phase difference between an output of the I-component optical modulation unit and an output of the Q-component optical modulation unit after the phase shift to $\pi/2$;

a QAM signal generation unit that multiplexes the output of the I-component optical modulation unit and the output of the Q-component optical modulation unit after the phase shift to generate the QAM signal;

an I-component data signal output unit that outputs an I-component data signal to the I-component optical modulation unit to cause the I-component optical modulation unit to modulate a continuous optical signal using the I-component data signal;

a Q-component data signal output unit that outputs a Q-component data signal to the Q-component optical modulation unit to cause the Q-component optical modulation unit to modulate a continuous optical signal using the Q-component data signal;

an I-component bias voltage signal output unit that outputs a signal having an I-component bias voltage corresponding to a null point of the I-component optical modulation unit to the I-component optical modulation unit;

a Q-component bias voltage signal output unit that outputs a signal having a Q-component bias voltage corresponding to a null point of the Q-component optical modulation unit to the Q-component optical modulation unit;

an I-component bias voltage signal adjustment unit that
determines whether an intensity of the QAM signal at a drift non-occurrence time where no drift occurs in the I-component bias voltage becomes larger or smaller than the intensity of the QAM signal at a drift occurrence time where a drift occurs in the I-component bias voltage,
adjusts the I-component bias voltage to maximize the intensity of the QAM signal when determining that the intensity of the QAM signal at the drift non-occurrence time becomes larger than the intensity of the QAM signal at the drift occurrence time, and
adjusts the I-component bias voltage to minimize the intensity of the QAM signal when determining that the intensity of the QAM signal at the drift non-occurrence time becomes smaller than the intensity of the QAM signal at the drift occurrence time; and a Q-component bias voltage signal adjustment unit that
determines whether the intensity of the QAM signal at a drift non-occurrence time where no drift occurs in the Q-component bias voltage becomes larger or smaller than the intensity of the QAM signal at a drift occurrence time where a drift occurs in the Q-component bias voltage,
adjusts the Q-component bias voltage to maximize the intensity of the QAM signal when determining that the intensity of the QAM signal at the drift non-occurrence time becomes larger than the intensity of the QAM signal at the drift occurrence time, and
adjusts the Q-component bias voltage to minimize the intensity of the QAM signal when determining that the intensity of the QAM signal at the drift non-occurrence time becomes smaller than the intensity of the QAM signal at the drift occurrence time.

In addition, the present disclosure provides an optical modulation device that generates a QAM signal whose order is set to be constant. The optical modulation device includes:

an I-component optical modulation unit that modulates a continuous optical signal for an I-component of the QAM signal;

a Q-component optical modulation unit that modulates a continuous optical signal for a Q-component of the QAM signal;

a phase shift unit that shifts a phase of an optical signal on an input side and/or an output side for the I-component optical modulation unit and/or the Q-component signal optical modulation unit to adjust a phase difference between an output of the I-component optical modulation unit and an output of the Q-component optical modulation unit after the phase shift to $\pi/2$;

a QAM signal generation unit that multiplexes the output of the I-component optical modulation unit and the output of the Q-component optical modulation unit after the phase shift to generate the QAM signal;

an I-component data signal output unit that outputs an I-component data signal whose amplitude is controlled to be constant to the I-component optical modulation unit to cause the I-component optical modulation unit to modulate a continuous optical signal using the I-component data signal;

a Q-component data signal output unit that outputs a Q-component data signal whose amplitude is controlled to be constant to the Q-component optical modulation unit to cause the Q-component optical modulation unit to modulate a continuous optical signal using the Q-component data signal;

an I-component bias voltage signal output unit that outputs a signal having an I-component bias voltage corresponding to a null point of the I-component optical modulation unit to the I-component optical modulation unit;

a Q-component bias voltage signal output unit that outputs a signal having a Q-component bias voltage corresponding to a null point of the Q-component optical modulation unit to the Q-component optical modulation unit;

an I-component bias voltage signal adjustment unit that maximizes or minimizes an intensity of the QAM signal to adjust the I-component bias voltage to an optimum value; and a Q-component bias voltage signal adjustment unit that maximizes or minimizes the intensity of the QAM signal to adjust the Q-component bias voltage to an optimum value.

In addition, the present disclosure provides a bias voltage control method, including:

I and Q component optical modulation steps of modulating continuous optical signals for I and Q components of a QAM signal;

a phase shift step of shifting a phase of an optical signal on an input side and/or an output side for the I-component optical modulation step and/or the Q-component optical modulation step and adjusting a phase difference between an output of the I-component optical modulation step and an output of the Q-component optical modulation step after the phase shift to π/2; and a QAM signal generation step of multiplexing the output of the I-component optical modulation step and the output of the Q-component optical modulation step after the phase shift to generate the QAM signal, wherein the I-component optical modulation step sequentially includes an I-component signal input step of
inputting an I-component data signal used to modulate a continuous modulation signal and
inputting a signal having an I-component bias voltage corresponding to a null point of the I-component optical modulation step and
an I-component bias voltage signal adjustment step of
determining whether an intensity of the QAM signal at a drift non-occurrence time where no drift occurs in the I-component bias voltage becomes larger or smaller than the intensity of the QAM signal at a drift occurrence time where a drift occurs in the I-component bias voltage,
adjusting the I-component bias voltage to maximize the intensity of the QAM signal when determining that the intensity of the QAM signal at the drift non-occurrence time becomes larger than the intensity of the QAM signal at the drift occurrence time, and
adjusting the I-component bias voltage to minimize the intensity of the QAM signal when determining that the intensity of the QAM signal at the drift non-occurrence time becomes smaller than the intensity of the QAM signal at the drift occurrence time, and
the Q-component optical modulation step sequentially includes
a Q-component signal input step of
inputting a Q-component data signal used to modulate a continuous modulation signal and
inputting a signal having a Q-component bias voltage corresponding to a null point of the Q-component optical modulation step and
a Q-component bias voltage signal adjustment step of
determining whether the intensity of the QAM signal at a drift non-occurrence time where no drift occurs in the Q-component bias voltage becomes larger or smaller than the intensity of the QAM signal at a drift occurrence time where a drift occurs in the Q-component bias voltage,
adjusting the Q-component bias voltage to maximize the intensity of the QAM signal when determining that the intensity of the QAM signal at the drift non-occurrence time becomes larger than the intensity of the QAM signal at the drift occurrence time, and
adjusting the Q-component bias voltage to minimize the intensity of the QAM signal when determining that the intensity of the QAM signal at the drift non-occurrence time becomes smaller than the intensity of the QAM signal at the drift occurrence time.

According to this configuration, it is possible to appropriately select whether to maximize or minimize an optical power in automatically controlling the bias voltage of an optical modulator.

In addition, the present disclosure provides the optical modulation device, further including:

an I-component calculation unit that calculates a value shown in Equation 5 when a voltage of the I-component data signal is $V_{mi}$ (where $m_i=0, 1, \ldots, n_i/2-1$ when a number of the I-component data signal level is $n_i$) and a half wavelength voltage of the I-component optical modulation unit is $V_{\pi i}$;

$$\sum_{m_i=0}^{n_i/2-1} \cos\left(\frac{V_{mi}}{V_{\pi i}}\pi\right);$$ (Equation 5)

and a Q-component calculation unit that calculates a value shown in Equation 6 when a voltage of the Q-component data signal is $V_{mq}$ (where $m_q=0, 1, \ldots, n_q/2-1$ when a number of the Q-component data signal level is $n_q$) and a half wavelength voltage of the Q-component optical modulation unit is $V_{\pi q}$, $$\sum_{m_q=0}^{n_q/2-1} \cos\left(\frac{V_{mq}}{V_{\pi q}}\pi\right)$$ (Equation 6)

wherein
the I-component bias voltage signal adjustment unit
determines that the intensity of the QAM signal at the drift non-occurrence time becomes larger than the intensity of the QAM signal at the drift occurrence time when the value shown in Equation 5 and calculated by the I-component calculation unit is negative and
determines that the intensity of the QAM signal at the drift non-occurrence time becomes smaller than the intensity of the QAM signal at the drift occurrence time when the value shown in Equation 5 and calculated by the I-component calculation unit is positive, and
the Q-component bias voltage signal adjustment unit
determines that the intensity of the QAM signal at the drift non-occurrence time becomes larger than the intensity of the QAM signal at the drift occurrence time when the value shown in Equation 6 and calculated by the Q-component calculation unit is negative and
determines that the intensity of the QAM signal at the drift non-occurrence time becomes smaller than the intensity of the QAM signal at the drift occurrence time when the value shown in Equation 6 and calculated by the Q-component calculation unit is positive.

According to this configuration, it is possible to appropriately select whether to maximize or minimize an optical power in consideration of the amplitude of a driving signal and the half wavelength voltage of an optical modulation unit in automatically controlling the bias voltage of an optical modulator.

In addition, the present disclosure provides the optical modulation device, wherein $V_{mi}$ is a constant at all times when a voltage-of the I-component data signal is $V_{mi}$ (where $m_i$=0, 1, ..., $n_i/2-1$ when a number of the I-component data signal level is $n_i$), $V_{mq}$ is a constant at all times when a voltage of the Q-component data signal is $V_{mq}$ (where $m_q$=0, 1, ..., $n_q/2-1$ when a number of the Q-component data signal level is $n_q$), the I-component bias voltage signal adjustment unit adjusts the I-component bias voltage to maximize the intensity of the QAM signal at all times when a constant set by Equation 7 is negative and adjusts the I-component bias voltage to minimize the intensity of the QAM signal at all times when the constant set by Equation 7 is positive, and $$\sum_{m_i=0}^{n_i/2-1} \cos\left(\frac{V_{mi}}{V_{\pi i}}\pi\right)$$ (Equation 7)

the Q-component bias voltage signal adjustment unit adjusts the Q-component bias voltage to maximize the intensity of the QAM signal at all times if a constant set by Equation 8 is negative and adjusts the Q-component bias voltage to minimize the intensity of the QAM signal at all times if the constant set by Equation 8 is positive.

$$\sum_{m_q=0}^{n_q/2-1} \cos\left(\frac{V_{mq}}{V_{\pi q}}\pi\right)$$ (Equation 8)

In addition, the present disclosure provides the optical modulation device, further including:

an I-component data signal voltage adjustment unit that adjusts, when the I-component bias voltage signal adjustment unit determines that the intensity of the QAM signal at the drift non-occurrence time becomes equal to the intensity of the QAM signal at the drift occurrence time, the voltage of the I-component data signal such that the I-component bias voltage signal adjustment unit determines that the intensity of the QAM signal at the drift non-occurrence time does not become equal to the intensity of the QAM signal at the drift occurrence time; and a Q-component data signal voltage adjustment unit that adjusts, when the Q-component bias voltage signal adjustment unit determines that the intensity of the QAM signal at the drift non-occurrence time becomes equal to the intensity of the QAM signal at the drift occurrence time, the voltage of the Q-component data signal such that the Q-component bias voltage signal adjustment unit determines that the intensity of the QAM signal at the drift non-occurrence time does not become equal to the intensity of the QAM signal at the drift occurrence time.

According to this configuration, the present disclosure is applicable since it is possible to select whether to maximize or minimize an optical power after adjusting the voltages of I and Q-component data signals even when it is not possible to select whether to maximize or minimize the optical power in automatically controlling the bias voltage of an optical modulator.

In addition, the present disclosure provides the optical modulation device, further including:

an I-component dither voltage signal output unit that outputs a signal, which is superposed on the signal having the I-component bias voltage and has an I-component dither voltage having a frequency $\omega_d$, to the I-component optical modulation unit; and a Q-component dither voltage signal output unit that outputs a signal, which is superposed on the signal having the Q-component bias voltage and has a Q-component dither voltage having a phase difference $\pi/2$ between the frequency $\omega_d$ and the I-component dither voltage, to the Q-component optical modulation unit, wherein the I-component bias voltage signal adjustment unit performs synchronous detection of the QAM signal with the signal having the I-component dither voltage and adjusts the I-component bias voltage such that a result of the synchronous detection becomes 0 to optimize the intensity of the QAM signal to an extreme value, and the Q-component bias voltage signal adjustment unit performs synchronous detection of the QAM signal with the signal having the Q-component dither voltage and adjusts the Q-component bias voltage such that a result of the synchronous detection becomes 0 to optimize the intensity of the QAM signal to an extreme value.

According to this configuration, it is possible to maximize or minimize an optical power with the application of dithering to an I-component bias voltage and a Q-component bias voltage.

In addition, the present disclosure provides the optical modulation device, further including:

a phase shift unit bias voltage signal output unit that outputs a signal having a phase shift unit bias voltage, which is used to adjust the phase difference between the output of the I-component optical modulation unit and the output of the Q-component optical modulation unit after the phase shift to $\pi/2$, to the phase shift unit; and a phase shift unit bias voltage signal adjustment unit that performs synchronous detection of the QAM signal with a signal having a frequency $2\omega_d$ twice the frequency $\omega_d$ and adjusts the phase shift unit bias voltage such that a result of the synchronous detection becomes 0 to adjust the phase difference between the output of the I-component optical modulation unit and the output of the Q-component optical modulation unit after the phase shift to $\pi/2$.

According to this configuration, it is possible to adjust the phase difference between an I-component and a Q-component to $\pi/2$ with the application of dithering to an I-component bias voltage and a Q-component bias voltage.

In addition, the present disclosure provides the optical modulation device, further including:

an I-component bias voltage signal sweeping unit that sweeps the I-component bias voltage in a range of $2 V_{\pi i}$ or larger at an initializing operation of the optical modulation device when the half wavelength voltage of the I-component optical modulation unit is $V_{\pi i}$;

a Q-component bias voltage signal sweeping unit that sweeps the Q-component bias voltage in a range of $2 V_{\pi q}$ or larger at the initializing operation of the optical modulation device when the half wavelength voltage of the Q-component optical modulation unit is $V_{\pi q}$;

a phase shift unit bias voltage signal initialization unit that performs synchronous detection of the QAM signal with the signal having frequency $2\omega_d$ twice the frequency $\omega_d$ while causing the I-component bias voltage signal sweeping unit and the Q-component bias voltage signal sweeping unit to perform the sweeping operation at the initializing operation of the optical modulation device and initializes the phase shift unit bias voltage such that a result of the synchronous detection becomes 0 or becomes the closest to 0 at all times in a range of the sweeping operation of I-component bias voltage signal sweeping unit and the Q-component bias voltage signal sweeping unit; and a post-initialization adjustment unit that causes the I-component bias voltage signal adjustment unit, the Q-component bias voltage signal adjustment unit, and the phase shift unit bias voltage signal adjustment unit to perform adjustment after the initialization of the phase shift unit bias voltage by the phase shift unit bias voltage signal initialization unit.

According to this configuration, after setting a phase shift unit bias voltage at an optimum value or a value close to the optimum value in a post-initialization state in which an I-component bias voltage, a Q-component bias voltage, and the phase shift unit bias voltage deviate from optimum values, it is possible to set the I-component bias voltage, the Q-component bias voltage, and the phase shift unit bias voltage at final optimum values in an after-initialization state in which the phase shift unit bias voltage is set at the optimum value or the value close to the optimum value.

In addition, the present disclosure provides the optical modulation device, further including:

a controller unit that stops the Q-component bias voltage signal adjustment unit when operating the I-component bias voltage signal adjustment unit and stops the I-component bias voltage signal adjustment unit when operating the Q-component bias voltage signal adjustment unit.

According to this configuration, it is possible to perform prompt and reliable convergence to a correct equilibrium point with the control of an I-component bias voltage and a Q-component bias voltage in a time sharing manner.

In addition, the present disclosure provides the optical modulation device, wherein a progression $\{V_{mi}\}$ becomes an arithmetic progression when the voltage of the I-component data signal is $V_{mi}$ (where $m_i=0, 1, \ldots, n_i/2-1$ when the number of the I-component data signal level is $n_i$), and a progression $\{V_{mq}\}$ becomes an arithmetic progression when the voltage of the Q-component data signal is $V_{mq}$ (where $m_q=0, 1, \ldots, n_q/2-1$ when the number of the Q-component data signal level is $n_q$).

According to this configuration, it is possible to easily obtain a constellation in a lattice pattern.

In addition, the present disclosure provides the optical modulation device, wherein a progression $\{\sin(V_{mi}/V_{\pi i} \times \pi/2)\}$ becomes an arithmetic progression when the voltage of the I-component data signal is $V_{mi}$ (where $m_i=0, 1, \ldots, n_i/2-1$ when the number of the I-component data signal level is $n_i$) and the half wavelength voltage of the I-component optical modulation unit is $V_{\pi i}$, and a progression $\{\sin(V_{mq}/V_{\pi q} \times \pi/2)\}$ becomes an arithmetic progression when the voltage of the Q-component data signal is $V_{mq}$ (where $m_q=0, 1, \ldots, n_q/2-1$ when the number of the Q-component data signal level is $n_q$) and the half wavelength voltage of the Q-component optical modulation unit is $V_{\pi q}$.

According to this configuration, it is possible to obtain an ideal constellation in a lattice pattern.

ADVANTAGEOUS EFFECTS OF DISCLOSURE

According to the present disclosure, it is possible to provide a technique for appropriately selecting whether to maximize or minimize an optical power in automatically controlling the bias voltage of an optical modulator.

DETAILED DESCRIPTION OF THE PREFERRED EMBODIMENTS

A description will be given, with reference to the accompanying drawings, of embodiments of the present disclosure. The embodiments, which will be described below, are exemplified to carry out the present disclosure and do not intend to limit the present disclosure. Here, the constituents with the same symbols in the specification and drawings are the same each other.

(Outline of the Present Disclosure)

Attention will be given to a case in which a dual-type IQ optical modulator M generates an optical QAM signal whose order is the square of n. Here, it is assumed that n is a positive even number. Each of a differential signal (Data1-Data1) applied to a first driving electrode 61 and a differential signal (Data2-Data2) applied to a second driving electrode 71 has n differential voltages $V_0, V_1, V_2, \ldots, -V_2, -V_1$, and $-V_0$. Here, it is assumed that $V_0 > V_1 > V_2 > \ldots > -V_2 > -V_1 > -V_0$ is established. When the half wavelength voltages of the first and second optical modulation units 2 and 3 are $V_\pi$, the upper limit of $|V_0|$ is desirably set at $V_\pi$ to prevent the occurrence of unnecessary overshoot. However, in order to realize non-linear bias dithering described in Non-Patent Literature 1, the absolute value of V having a minimum absolute value may be less than $V_\pi$ and the absolute value of V having another absolute value may be greater than or equal to $V_\pi$.

Figure 2:
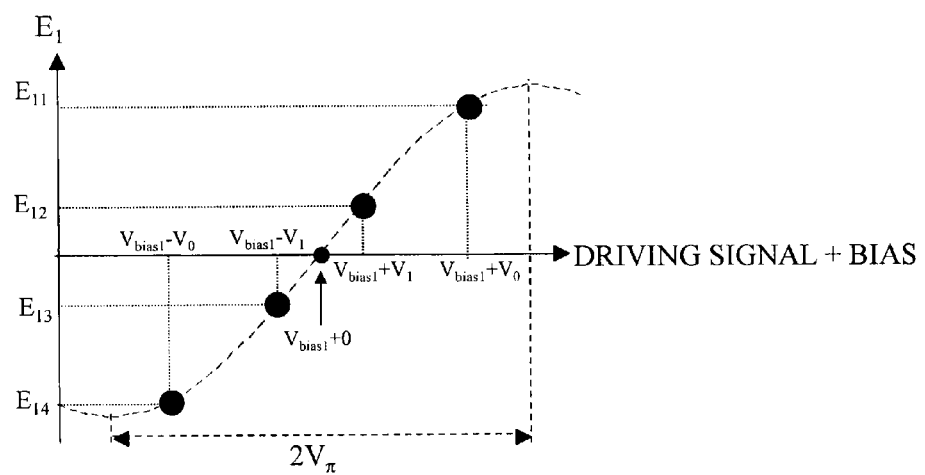
FIG. 2 is a diagram showing the characteristics of the optical modulation device in a case in which no bias drift occurs.

If all bias voltages have ideal values, the electric field of the output light of the first and second optical modulation units 2 and 3 is expressed by $\sin(\pm V_m/V_\pi \times \pi/2)$ as shown in FIG. 2. Here, m is an integer of 0 to n/2−1. In addition, since optical power $P_{total}$ is proportional to the square of the electric field of light, $P_{total}$ is expressed by Equation 9. Hereinafter, a non-essential coefficient will be omitted.

$$P_{total} = 4n \sum_{m=0}^{n/2-1} \sin^2\left(\frac{V_m}{V_\pi}\frac{\pi}{2}\right) \quad \text{(Equation 9)}$$

Figure 3:
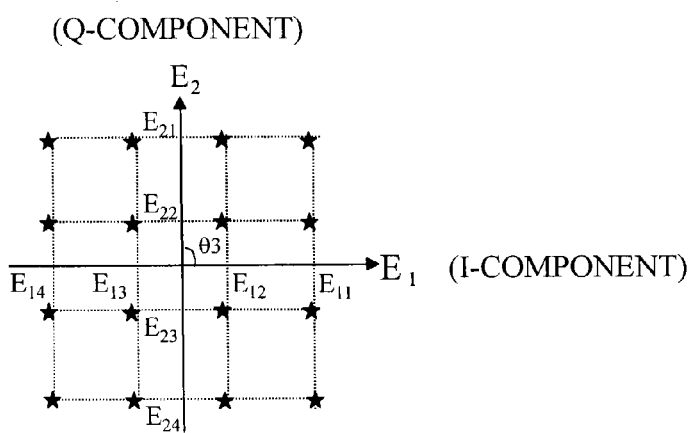
FIG. 3 is a diagram showing a constellation in a case in which no bias drift occurs.
Figure 4:
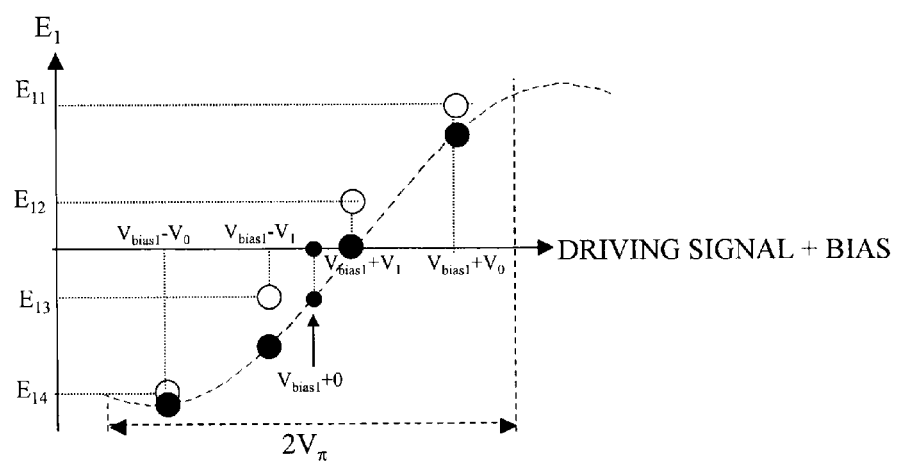
FIG. 4 is a diagram showing the characteristics of the optical modulation device in a case in which a bias drift occurs.

A method for deriving Equation 9 will be described below. As shown in FIG. 3, the sum of the optical power is expressed by Equation 10 for the four symbols of the first quadrant of 16QAM.

$$\begin{aligned}P_{total} &= (E_{11}^2 + E_{21}^2) + (E_{11}^2 + E_{22}^2) + (E_{12}^2 + E_{21}^2) + \\ &\quad (E_{12}^2 + E_{22}^2) \\ &= 2(E_{11}^2 + E_{12}^2 + E_{21}^2 + E_{22}^2) \\ &= 2 \times 2 \times \left\{\sin^2\left(\frac{V_0}{V_\pi}\frac{\pi}{2}\right) + \sin^2\left(\frac{V_1}{V_\pi}\frac{\pi}{2}\right)\right\}\end{aligned} \quad \text{(Equation 10)}$$

For the 16 symbols of all the quadrants of the 16QAM, the sum of the optical power is expressed by Equation 11.

$$P_{total} = 4 \times 2 \times 2 \times \left\{\sin^2\left(\frac{V_0}{V_\pi}\frac{\pi}{2}\right) + \sin^2\left(\frac{V_1}{V_\pi}\frac{\pi}{2}\right)\right\} \quad \text{(Equation 11)}$$

Further, for a general n, Equation 9 is established.

Figure 5:
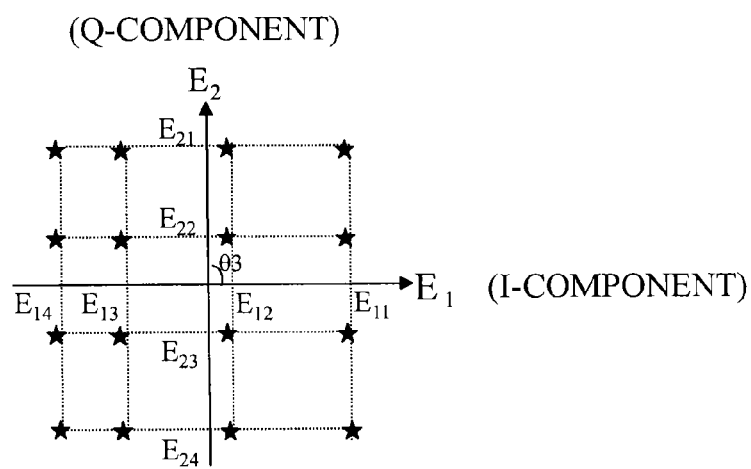
FIG. 5 is a diagram showing a constellation in a case in which a bias drift occurs.
Figure 6:
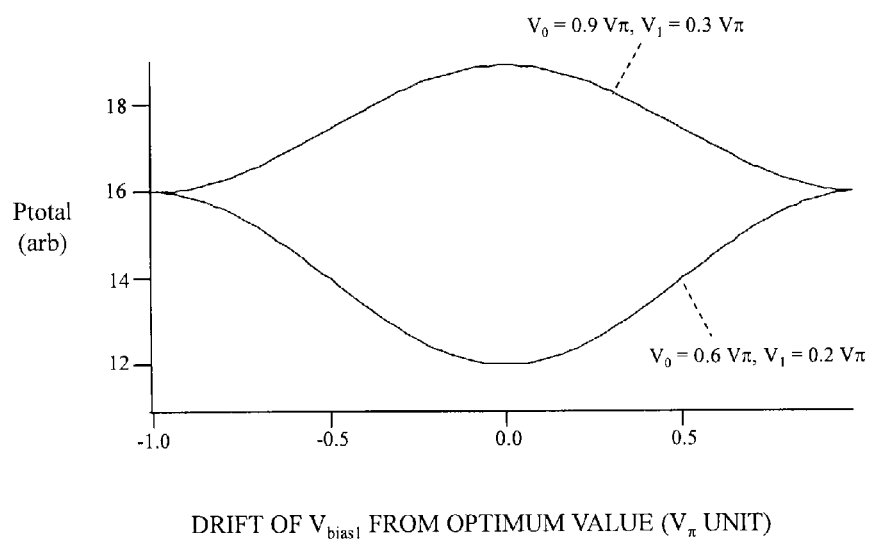
FIG. 6 is a diagram showing the relationship between the drift of a bias voltage and the intensity of an optical signal.
Figure 7:
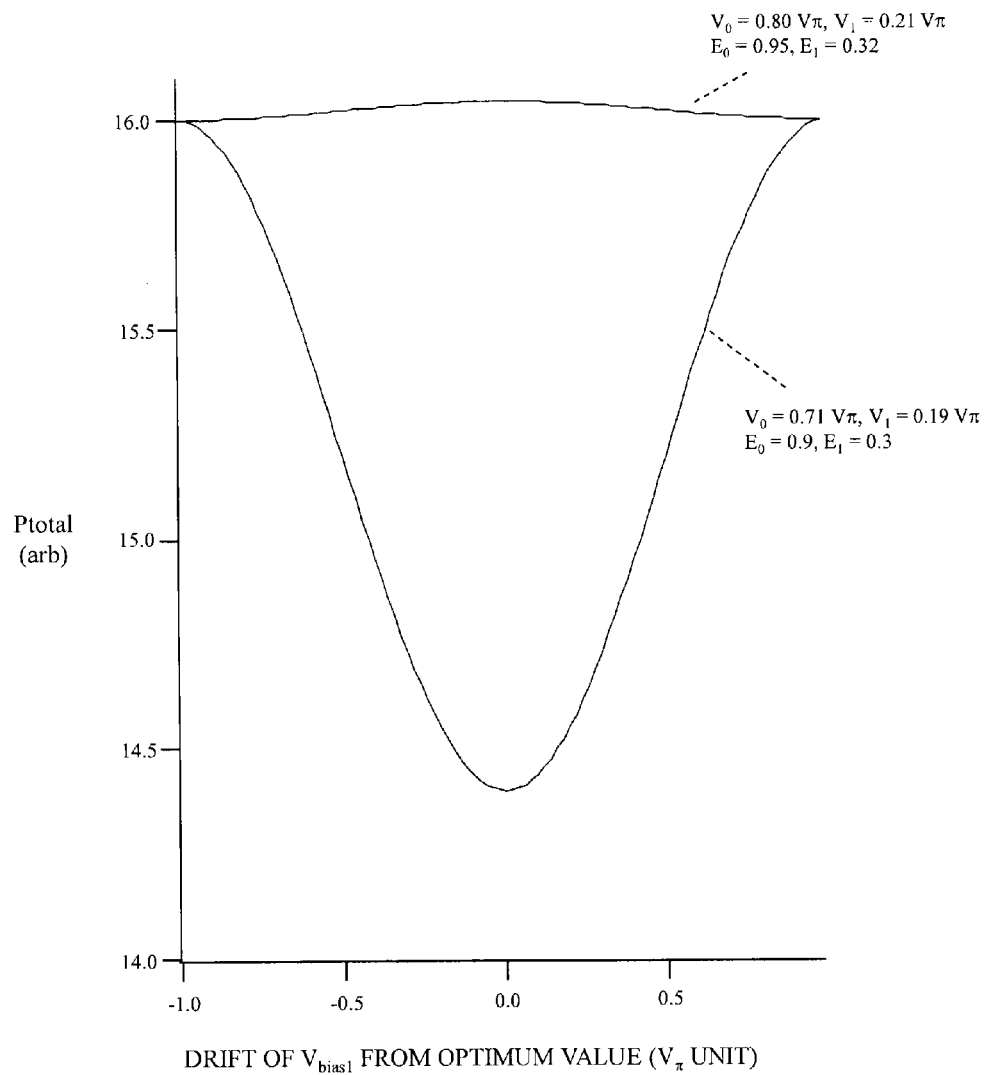
FIG. 7 is a diagram showing the relationship between the drift of the bias voltage and the intensity of the optical signal.

Here, for simplicity, it is assumed that only $V_{bias1}$ drifts and shifts by $V_d$. As shown in FIG. 5, some absolute values of $V_m$ increase or decrease, and $P_{total}$ changes from Equation 9 to Equation 12.

$$\begin{aligned}P_{total} &= n\sum_{m=0}^{n/2-1}\sin^2\left(\frac{V_m+V_d}{V_\pi}\frac{\pi}{2}\right) + \\ &\quad n\sum_{m=0}^{n/2-1}\sin^2\left(\frac{V_m-V_d}{V_\pi}\frac{\pi}{2}\right) + 2n\sum_{m=0}^{n/2-1}\sin^2\left(\frac{V_m}{V_\pi}\frac{\pi}{2}\right)\end{aligned} \quad \text{(Equation 12)}$$

A method for deriving Equation 12 will be described below. Since $V_{bias1}$ shifts by $V_d$, Equation 13 is established.

$$\begin{aligned}E_{11} &= \sin\left(\frac{V_0+V_d}{V_\pi}\frac{\pi}{2}\right), \\ E_{12} &= \sin\left(\frac{V_1+V_d}{V_\pi}\frac{\pi}{2}\right), \\ E_{13} &= \sin\left(\frac{-V_1+V_d}{V_\pi}\frac{\pi}{2}\right) = -\sin\left(\frac{V_1-V_d}{V_\pi}\frac{\pi}{2}\right), \\ E_{14} &= \sin\left(\frac{-V_0+V_d}{V_\pi}\frac{\pi}{2}\right) = -\sin\left(\frac{V_0-V_d}{V_\pi}\frac{\pi}{2}\right)\end{aligned} \quad \text{(Equation 13)}$$

Since $V_{bias2}$ does not shift, Equation 14 is established.

$$\begin{aligned}E_{21} &= \sin\left(\frac{V_0}{V_\pi}\frac{\pi}{2}\right), \\ E_{22} &= \sin\left(\frac{V_1}{V_\pi}\frac{\pi}{2}\right), \\ E_{23} &= \sin\left(\frac{-V_1}{V_\pi}\frac{\pi}{2}\right) = -\sin\left(\frac{V_1}{V_\pi}\frac{\pi}{2}\right), \\ E_{24} &= \sin\left(\frac{-V_0}{V_\pi}\frac{\pi}{2}\right) = -\sin\left(\frac{V_0}{V_\pi}\frac{\pi}{2}\right)\end{aligned} \quad \text{(Equation 14)}$$

When the sum of the square of each electric field is calculated, Equation 12 is established for a general n.

When $P_{total}$ is differentiated by $V_d$, Equation 15 is obtained.

$$\frac{dP_{total}}{dV_d} = 2n\sin\left(\frac{V_d}{V_\pi}\pi\right)\sum_{m=0}^{n/2-1}\cos\left(\frac{V_m}{V_\pi}\pi\right) \quad \text{(Equation 15)}$$

Because of the periodicity of an MZI type optical modulator, ideal $V_{bias1}$ is obtained not only under $V_d=0$ but also under $V_d=\pm 2 V_\pi$, $\pm 4 V_\pi$, etc. As is evident from Equation 15, the optical power $P_{total}$ shows a maximum or minimum value under $V_d=0$, $\pm 2 V_\pi$, $\pm 4 V_\pi$, etc. In the following description, the vicinity of $V_d=0$ will be considered.

Figure 8A:
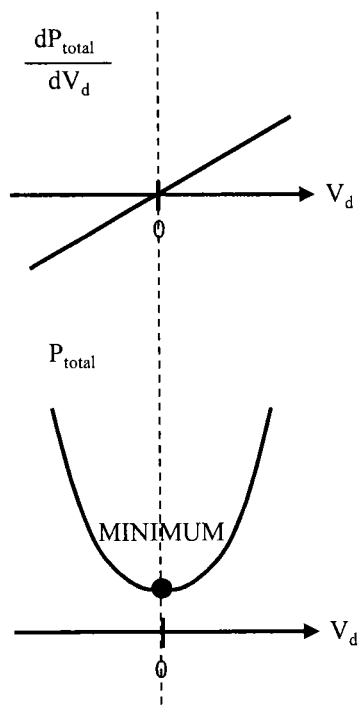
FIG. 8(a) is a diagram showing the characteristics of an optical modulation device according to the present disclosure.
Figure 8B:
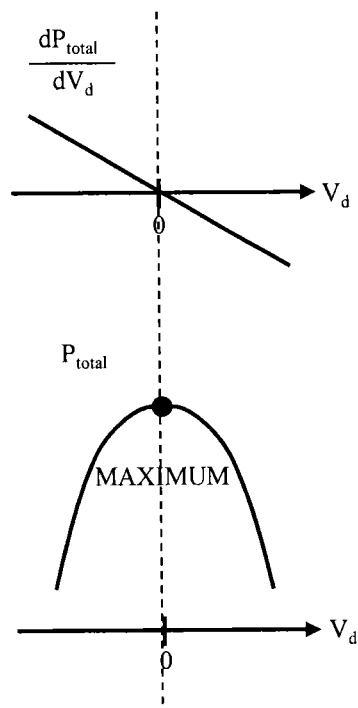
FIG. 8(b) is a diagram showing the characteristics of an optical modulation device according to the present disclosure.
Figure 8C:
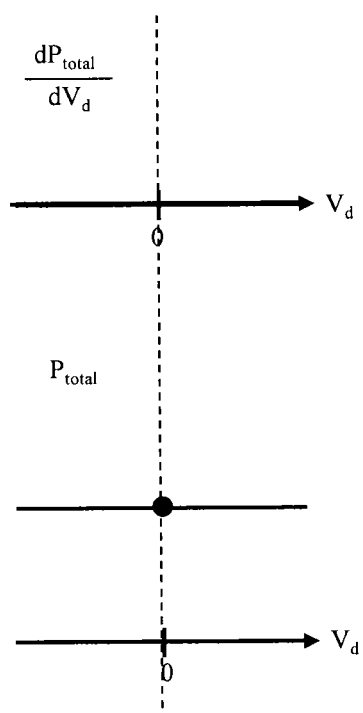
FIG. 8(c) is a diagram showing the characteristics of an optical modulation device according to the present disclosure.

FIGS. 8(a), (b) and (c) show the characteristics of an optical modulation device according to the present disclosure. If it is not certain whether a value shown in Equation 16 is a positive or negative value, it is not certain whether the optical power $P_{total}$ shows a maximum or minimum value under $V_d=0$. In view of this, determination is made depending on the sign of the value shown in Equation 16.

$$\sum_{m=0}^{n/2-1}\cos\left(\frac{V_m}{V_\pi}\pi\right) \quad \text{(Equation 16)}$$

Since $dP_{total}/dV_d$ shown in Equation 15 becomes 0 under $V_d=0$ and increases with an increase in $V_d$ if the value shown in Equation 16 is positive, the optical power $P_{total}$ has a minimum value under $V_d=0$. Accordingly, when $V_{bias1}$ is controlled such that $P_{total}$ becomes minimum, an ideal bias voltage is obtained.

Since $dP_{total}/dV_d$ shown in Equation 15 becomes 0 under $V_d=0$ and decreases with an increase in $V_d$ if the value shown in Equation 16 is negative, the optical power $P_{total}$ has a maximum extreme value under $V_d=0$. Accordingly, when $V_{bias1}$ is controlled such that $P_{total}$ becomes maximum, an ideal bias voltage is obtained.

Since $dP_{total}/dV_d$ shown in Equation 15 becomes 0 for any value of $V_d$ if the value shown in Equation 16 is 0, the optical power $P_{total}$ becomes equal for any value of $V_d$. Accordingly, when $V_{bias1}$ is controlled such $P_{total}$ becomes maximum or minimum, it is not certain whether an ideal bias voltage is obtained. In view of this, driving signals $V_0, V_1, V_2, \ldots, -V_2, -V_1$, and $-V_0$, with which the value shown in Equation 16 becomes 0, are prevented. Meanwhile, if the optical modulator is designed such that the number of level n and the amplitude $V_m$ of a driving signal are constant at all times during the operation period of the optical modulation device, the value shown in Equation 16 becomes also constant. In this case, determination as to whether $P_{total}$ should be maximum or minimum is uniquely made when the optical modulation device is designed. In such a case, there is no need to repeat determination using Equation 16 as occasion demands during the operation period.

The dual drive type IQ optical modulator is used in the above description, however a single drive type IQ optical modulator applies single end drive signals instead of differential driving signals to the first and second driving electrodes 61 and 71. If the potentials of such driving signals with respect to the ground are set at $V_0, V_1, V_2, \ldots, -V_2, -V_1$, and $-V_0$, completely the same discussion as the above is established.

The above description refers to an example in which a constellation is a lattice and square array. However, in optical electric field generated by other type of QAM signal, some of the lattice and square array is cut out, in order to facilitate the multiplexing of a binary signal.

Figure 9:
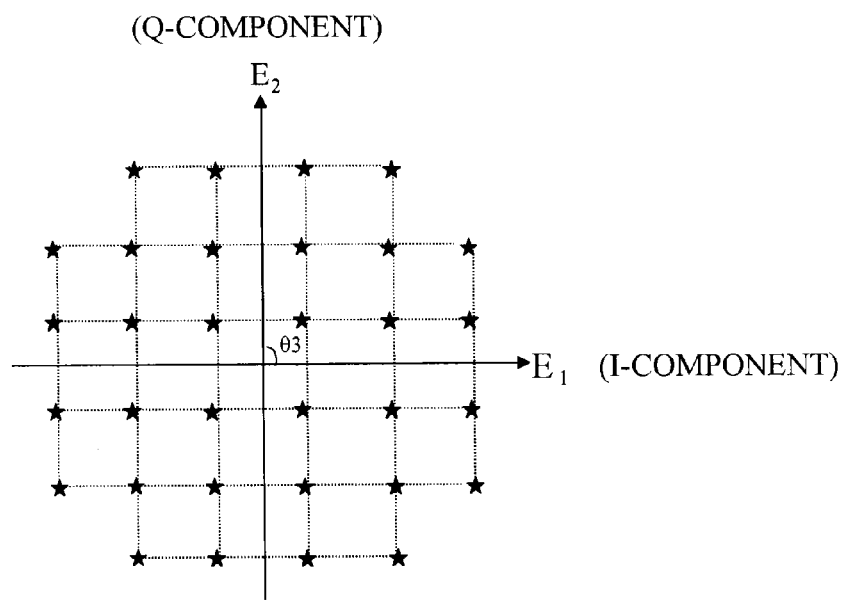
FIG. 9 is a diagram showing the constellation of an optical 32 QAM signal.

As a specific example, FIG. 9 shows the constellation of a 32 QAM signal. In the 32 QAM signal, the four apexes of the constellation of a 36 QAM signal are prohibited, and only 32 types of optical electric fields are used. With the use of the 32 types of optical electric fields, it is possible to efficiently multiplex the five binary signals, because $2^5=32$.

For the 32 QAM signal, if a term corresponding to a prohibited rule is divided from a series and Equation 9 is deformed into Equation 17 to calculate $P_{total}$ in Equation 9, the same discussion as the above description is established. The same applies to QAM signals with other irregular constellations.

$$P_{total} = 4n \sum_{m=0}^{n/2-1} \sin^2\left(\frac{V_m}{V_\pi}\frac{\pi}{2}\right) - 4\sin^2\left(\frac{V_0}{V_\pi}\frac{\pi}{2}\right) \quad \text{(Equation 17)}$$

First Embodiment

Figure 10:
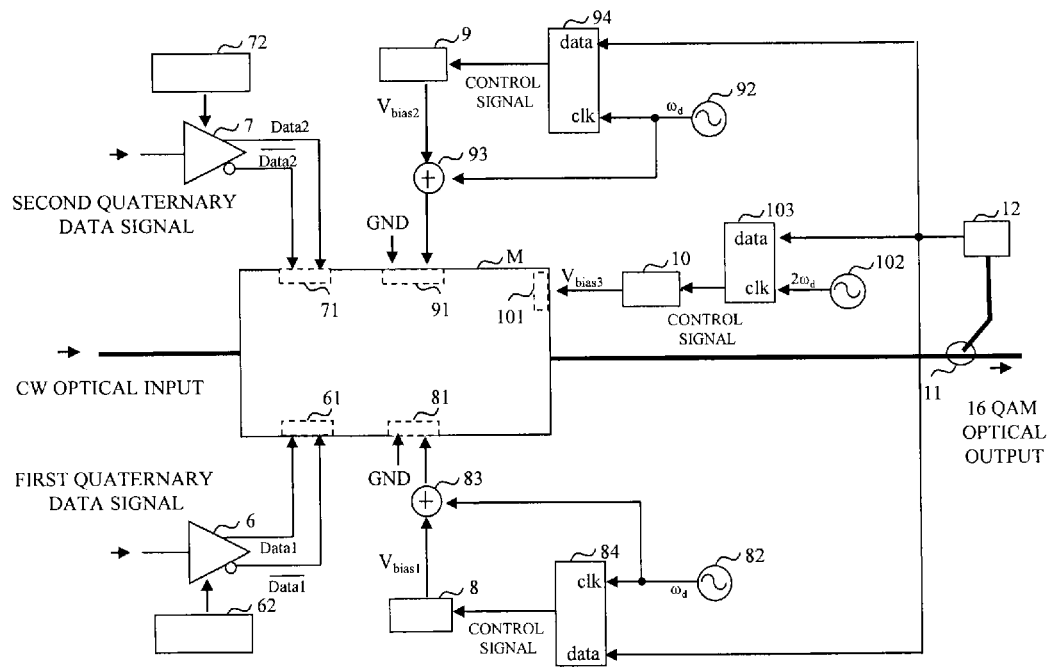
FIG. 10 is a diagram showing the configuration of an optical modulation device according to a first embodiment.

FIG. 10 shows the configuration of an optical modulation device according to a first embodiment. In the dual drive type IQ optical modulator M, the differential drive signals Data1 and Data1 and Data2 and Data2 output from the first and second driving amplifiers 6 and 7 are applied to the first and second driving electrodes 61 and 71. The first and second quaternary data signals are input to the first and second driving amplifiers 6 and 7 and the output amplitudes of the signals are adjusted by the first and second amplitude adjustment units 62 and 72. In the first embodiment, pre-emphasis is not used, and the four signal levels $V_0, V_1, -V_1$, and $-V_0$ of the differential signals added to the first and second driving electrodes 61 and 71 are set at even intervals. In other words, (Data1-Data1) and (Data2-Data2) have the four values $V_0, V_1, -V_1$, and $-V_0$, and $|V_0-V_1|=|V_1-(-V_1)|$ is established.

As a first specific example, it is assumed that the interval between the four levels of driving signals is set at 0.6 $V_\pi$. In this case, $V_0=0.9 V_\pi$ and $V_1=0.3 V_\pi$ are established. When these values are substituted into Equation 16, −0.36 is obtained. Based on the above discussion, when $V_{bias1}$ and $V_{bias2}$ are controlled such that $P_{total}$ becomes maximum on this occasion, the most suitable modulation state is obtained.

As a second specific example, it is assumed that the interval between the four levels of driving signals is set at 0.4 $V_\pi$. In this case, $V_0=0.6 V_\pi$ and $V_1=0.2 V_\pi$ are established. When these values are substituted into Equation 16, 0.5 is obtained. Based on the above discussion, when $V_{bias\ 1}$ and $V_{bias2}$ are controlled such that $P_{total}$ becomes minimum on this occasion, the most suitable modulation state is obtained.

As a third specific example, it is assumed that the interval between the four levels of driving signals is set at 0.5 $V_\pi$. In this case, $V_0=0.75 V_\pi$ and $V_1=0.25 V_\pi$ are established. When these values are substituted into Equation 16, 0 is obtained. Based on the above discussion, such driving signals are prohibited in the present disclosure. If the value of Equation 16 becomes 0, the values $V_0, V_1, -V_1$, and $-V_0$ are changed to other values using the first and second amplitude adjustment units 62 and 72.

In the IQ optical modulator M, the data bias voltages $V_{bias1}$ and $V_{bias2}$ output from the first and second bias power supplies 8 and 9 are applied to the first and second bias electrodes 81 and 91, respectively. Each of the first and second optical modulation units 2 and 3 has two arms, however the remaining one arm of each of the first and second optical modulation units 2 and 3 to which no data bias voltage is applied is grounded.

Dithering is applied to $V_{bias1}$ and $V_{bias2}$ by a first oscillator 82, a first adder 83, a second oscillator 92, and a second adder 93 at a frequency $\omega_d$. The amplitude of the dithering is kept at a level at which the quality of a 16 QAM signal is not degraded. The frequency $\omega_d$ is set to be substantially lower than the baud rate of the 16 QAM signal and be in the order of kHz at most. Considering that the phase difference between an I-component and a Q-component is $\pi/2$, the phases of the first and second oscillators 82 and 92 are set to be orthogonal to each other. In the first embodiment, it is assumed that the output of the first oscillator 82 is expressed as $\cos(\omega_d t)$ and that of the second oscillator 92 is expressed as $\sin(\omega_d t)$. Here, t expresses the time. Accordingly, dithering synchronized with $\cos(\omega_d t)$ is applied to $V_{bias1}$, and dithering synchronized with $\sin(\omega_d t)$ is applied to $V_{bias2}$.

The 16 QAM signal output from the IQ optical modulator M is branched by an optical demultiplexing coupler 11 and input to an optical power monitor 12. The band of the optical power monitor 12 may be nearly twice the frequency $\omega_d$ of the dithering. Some of the output of the optical power monitor 12 is input to the first and second synchronous detection circuits 84 and 94.

Here, it is assumed that a bias drift occurs in $V_{bias1}$ and $V_{bias1}$ shifts from its optimum value to a positive or negative side. The optical power of the 16 QAM signal becomes no longer an extreme value and increases or decreases depending on the symbol of Equation 16. Since the dithering of $\cos(\omega_d t)$ is applied to $V_{bias1}$, it is possible to determine the positive and negative of the shift of the optical power if synchronous detection is performed by the first synchronous detection circuit 84 with the output of the first oscillator 82 as a reference clock. Based on the determination result, a control signal is sent to the first bias power supply 8 to give feedback to $V_{bias1}$ such that the synchronous detection result becomes 0. The state in which the synchronous detection result becomes 0 is realized by two states in which the optical power has a maximum or minimum extreme value, however the selection is uniquely determined by the positive and negative of Equation 16 and a method for applying a bias. As is the case with the control of $V_{bias1}$, the control of $V_{bias2}$ is performed using the second oscillator 92 and the second synchronous detection circuit 94.

$V_{bias3}$ output from a third bias power supply 10 is applied to an orthogonal bias electrode 101 of the IQ optical modulator M. No dithering is applied to $V_{bias3}$.

Here, it is assumed that a bias drift occurs in $V_{bias3}$ and $V_{bias3}$ shifts from its optimum value to a positive or negative side. At this time, as described in detail in Non-Patent Literature 1, the optical power of the 16 QAM signal has an extreme value at phases $\pi/4$ and $5\pi/4$ for the frequency $\omega_d$, so that the intensity modulation component of a frequency $2\omega_d$ appears in the optical power of the 16 QAM signal. The phase of the intensity modulation component of the frequency $2\omega_d$ is determined by the positive and negative of the shift of $V_{bias3}$.

Some of the output of the optical power monitor 12 is input to a third synchronous detection circuit 103. The third synchronous detection circuit 103 detects the intensity modulation component of the frequency $2\omega_d$ from the optical power of the 16 QAM signal with the oscillation signal of the frequency $2\omega_d$ output from the third oscillator 102 as a reference clock, determines the positive and negative of the shift of $V_{bias3}$ from the phase, and sends a control signal to the third bias power supply 10 to give a feedback such that $V_{bias3}$ becomes optimum.

In the first embodiment, the first, second, and third synchronous detection circuits 84, 94, and 103 are used. Here, these circuits may be integrated into one circuit to change the frequency of a reference clock between $\omega_d$ and $2\omega_d$ in the one synchronous detection circuit. Or the frequency of the reference clock may be fixed at $\omega_d$ to detect a secondary higher harmonic wave having the frequency $2\omega_d$.

Second Embodiment

Figure 11:
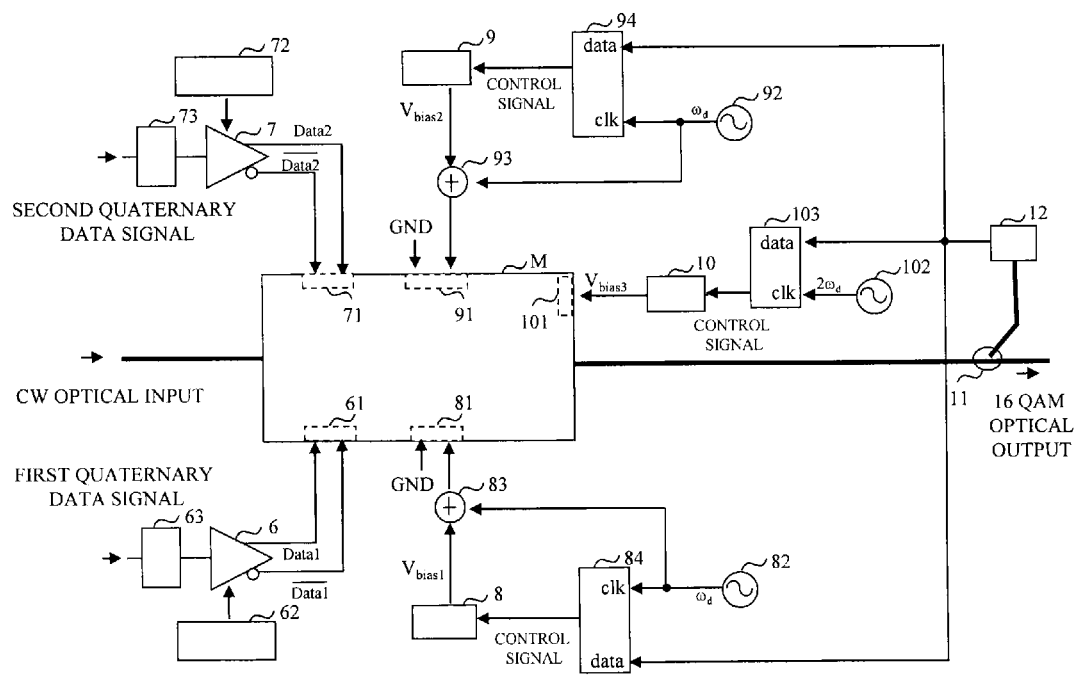
FIG. 11 is a diagram showing the configuration of an optical modulation device according to a second embodiment.

FIG. 11 shows the configuration of an optical modulation device according to a second embodiment. As the difference between the first and second embodiments, pre-emphasis is used to set the values of the electric fields $E_{11}$, $E_{12}$, $E_{13}$, and $E_{14}$ of the four types of light output from the first optical modulation unit 2 at even intervals and set the values of the electric fields $E_{21}$, $E_{22}$, $E_{23}$, and $E_{24}$ of the four types of light output from the second optical modulation unit 3 at even intervals. In other words, Equation 18 is established.

$E_{11}=E_{21}=\sin(V_0/V_\pi \times \pi/2)$ $E_{12}=E_{22}=\sin(V_1/V_\pi \times \pi/2)$ $E_{13}=E_{23}=\sin(-V_1/V_\pi \times \pi/2)$ $E_{14}=E_{24}=\sin(-V_0/V_\pi \times \pi/2)$ $|\sin(V_0/V_\pi \times \pi/2)-\sin(V_1/V_\pi \times \pi/2)|=2|\sin(V_1/V_\pi \times \pi/2)|$ (Equation 18)

Required $V_0$ and $V_1$ are obtained when the first and second quaternary data signals are input to the first and second pre-emphasis units 63 and 73, respectively. The control of $V_{bias1}$ to $V_{bias3}$ is performed in the same manner as the first embodiment.

As a first specific example, it is assumed that $E_{11}-E_{12}=E_{12}-E_{13}=E_{13}-E_{14}=E_{21}-E_{22}=E_{22}-E_{23}=E_{23}-E_{24}=0.63$ is set. In this case, $V_0=0.80 V_\pi$ and $V_1=0.21 V_\pi$ are established. When these values are substituted into Equation 16, $-0.006$ is obtained. Based on the above discussion, when $V_{bias1}$ and $V_{bias2}$ are controlled such that $P_{total}$ becomes maximum on this occasion, the most suitable modulation state is obtained.

As a second specific example, it is assumed that $E_{11}-E_{12}=E_{12}-E_{13}=E_{13}-E_{14}=E_{21}-E_{22}=E_{22}-E_{23}=E_{23}-E_{24}=0.60$ is set. In this case, $V_0=0.71 V_\pi$ and $V_1=0.19 V_\pi$ are established. When these values are substituted into Equation 16, 0.20 is obtained. Based on the above discussion, when $V_{bias1}$ and $V_{bias2}$ are controlled such that $P_{total}$ becomes minimum on this occasion, the most suitable modulation state is obtained.

Third Embodiment

Figure 12:
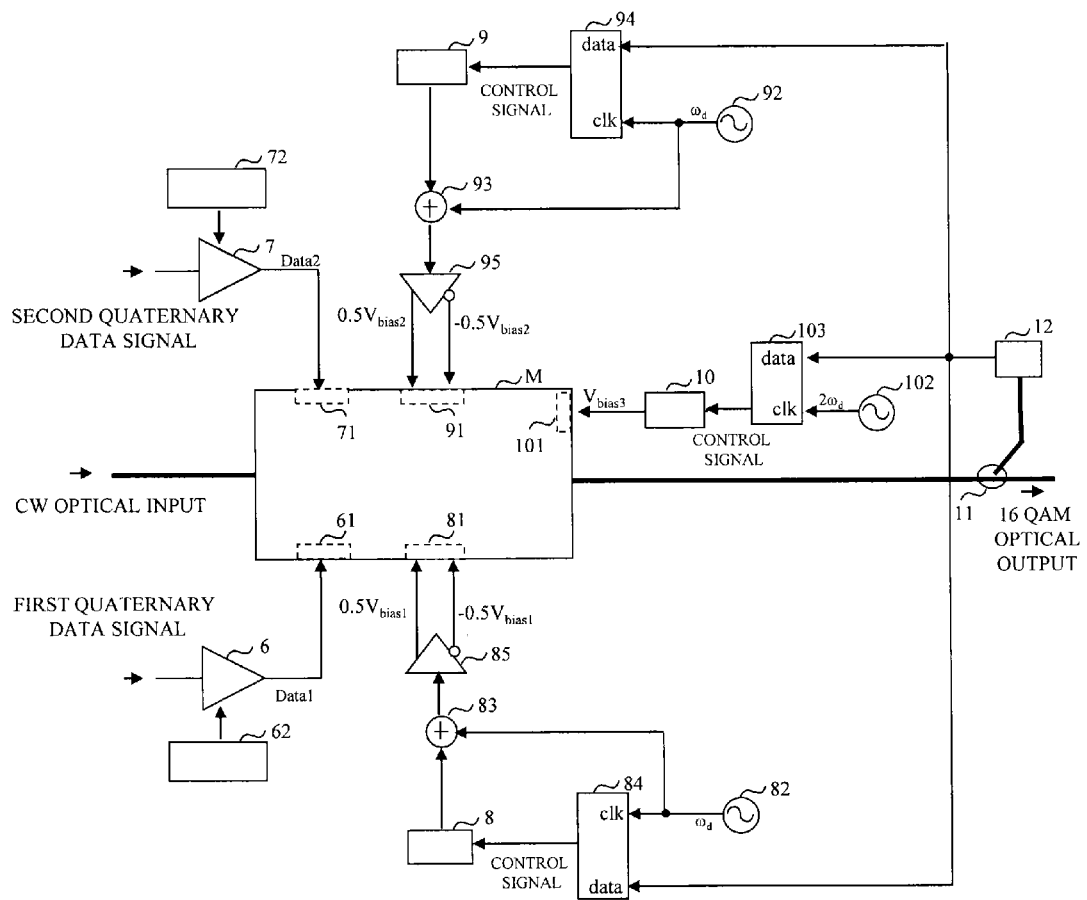
FIG. 12 is a diagram showing the configuration of an optical modulation device according to a third embodiment.

FIG. 12 shows the configuration of an optical modulation device according to a third embodiment. The third embodiment is different from the first embodiment in two points.

A first different point is that this embodiment uses a single driving type IQ optical modulator M instead of a dual driving type IQ optical modulator M. Each of the first and second driving amplifiers 6 and 7 performs a single-phase output, and their outputs Data1 and Data2 have the four signal levels $V_0$, $V_1$, $-V_1$, and $-V_0$ relative to the ground level. Although twice the output amplitude of the first embodiment is required, there is an advantage in that the mounting area of the IQ optical modulator M can be reduced.

Figure 1:
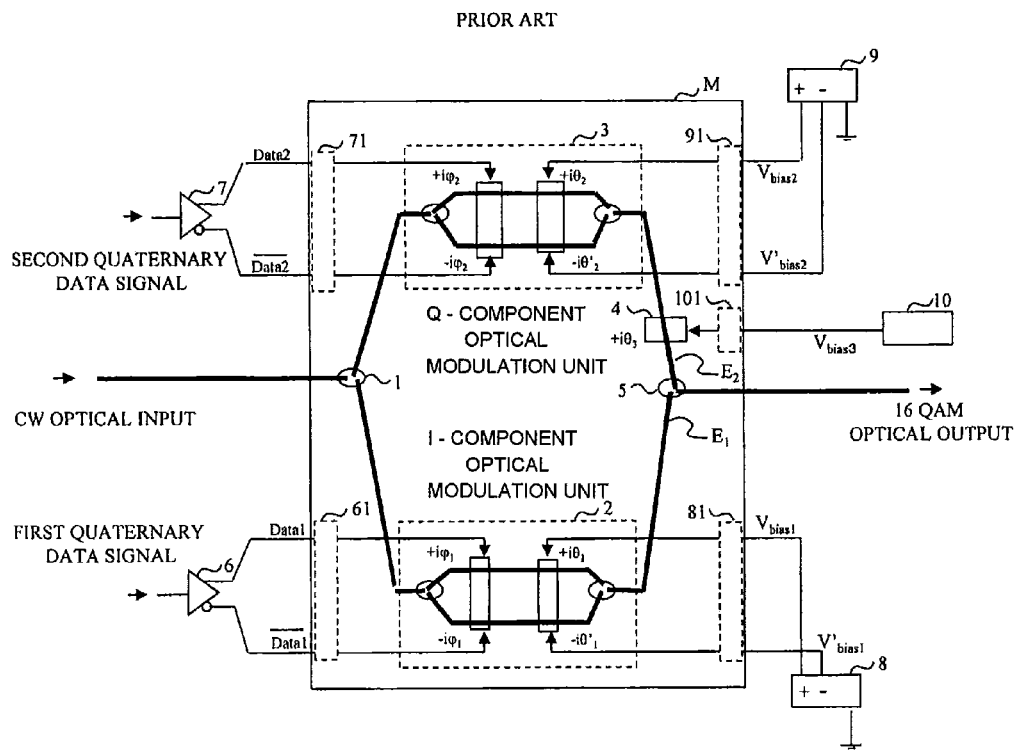
FIG. 1 is a diagram showing the configuration of an optical modulation device in the related art.

A second different point is that the first and second bias power supplies 8 and 9 perform a single-phase output, their DC voltages are converted into differential signals by the first and second dithering amplifiers 85 and 95 after having the outputs of the first and second oscillators 82 and 92 superposed thereon with the first and second adders 83 and 93, and applied to the first and second bias electrodes 81 and 91. Accordingly, in FIG. 1, dithering synchronized with $\cos(\omega_d t)$ and $\cos(\omega_d t+\pi)$ is applied to $V_{bias1}$ and $V'_{bias1}$, and dithering synchronized with $\sin(\omega_d t)$ and $\sin(\omega_d t+\pi)$ is applied to $V_{bias2}$ and $V'_{bias2}$.

Fourth Embodiment

Figure 13:
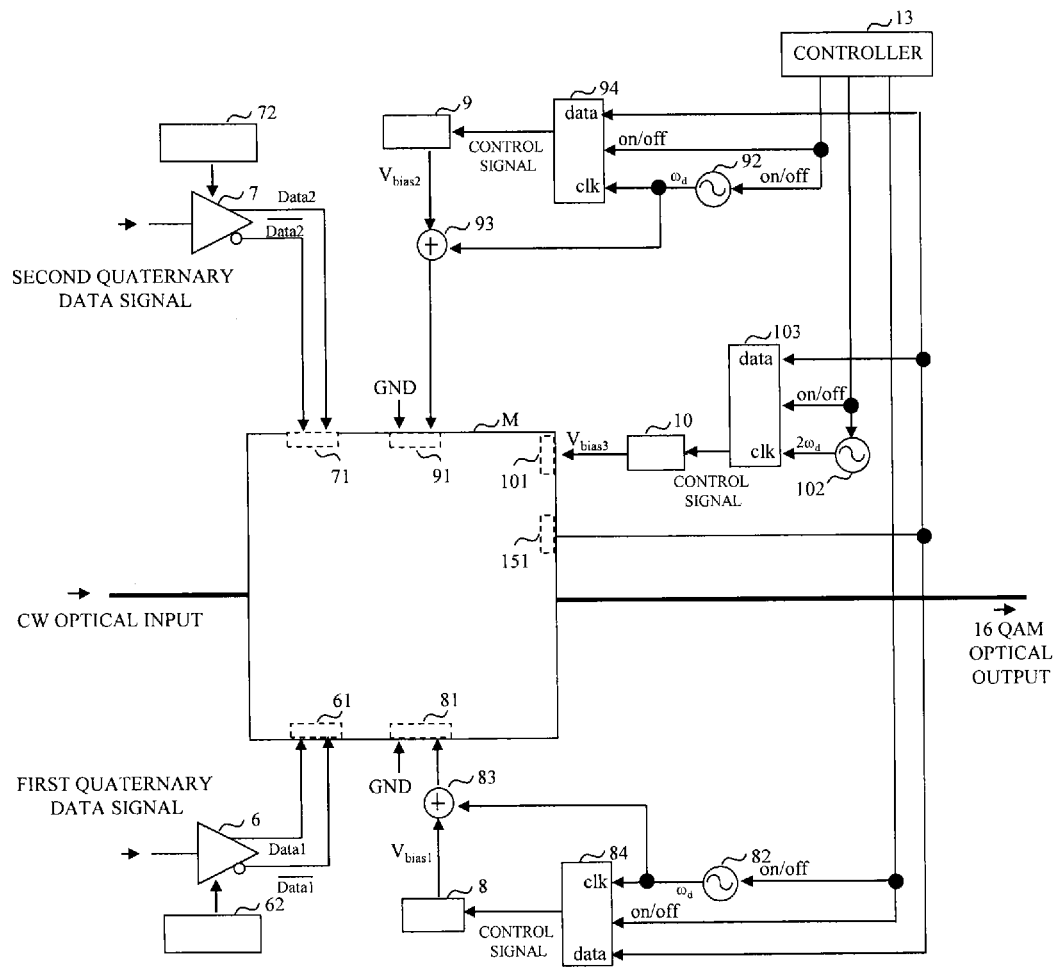
FIG. 13 is a diagram showing the configuration of an optical modulation device according to a fourth embodiment.
Figure 14:
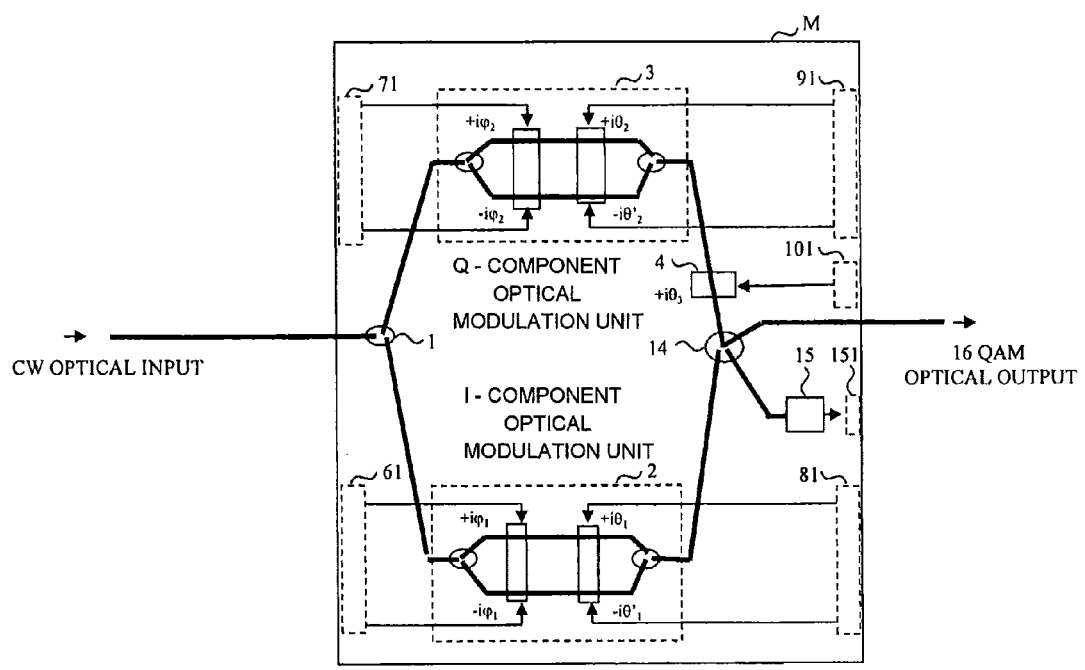
FIG. 14 is a diagram showing the configuration of the optical modulation device according to the fourth embodiment.

FIGS. 13 and 14 show the configuration of an optical modulation device according to a fourth embodiment. The fourth embodiment is different from the first embodiment in two points.

A first different point is that the first oscillator 82, the second oscillator 92, the third oscillator 102, the first synchronous detection circuit 84, the second synchronous detection circuit 94, and the third synchronous detection circuit 103 are controlled by a controller 13 and operated in a time sharing manner for each bias voltage.

In this embodiment, first, only the first oscillator 82 and the first synchronous detection circuit 84 are driven to optimize $V_{bias1}$. The control of $V_{bias1}$ is stopped when $V_{bias1}$ is stabilized. Next, only the second oscillator 92 and the second synchronous detection circuit 94 are driven to optimize the control of $V_{bias2}$. The control of $V_{bias2}$ is stopped when $V_{bias2}$ is stabilized. Then, only the third oscillator 102 and the third synchronous detection circuit 103 are driven to optimize the control of $V_{bias3}$. The control of $V_{bias3}$ is stopped when $V_{bias3}$ is stabilized, and the process returns to the control of $V_{bias1}$ again. With the sequential bias control in a time sharing manner as described above, it becomes possible to perform more prompt and reliable convergence to an equilibrium point.

When the third oscillator 102 and the third synchronous detection circuit 103 are driven, the first oscillator 82 and the second oscillator 92 are further driven and the control of $V_{bias3}$ is optimized by the dithering of $V_{bias1}$ and $V_{bias2}$ as described in detail in Non-Patent Literature 1.

A second different point is that an optical multiplexing/demultiplexing coupler 14, a photo detector 15, and an optical power monitor terminal 151 internal to the IQ optical modulator M are used instead of a second optical coupler 5, the optical demultiplexing coupler 11, and the optical power monitor 12 external to the IQ optical modulator M. Here, there is a direction for using the commercially-available IQ optical modulator M shown in FIG. 14.

The optical multiplexing/demultiplexing coupler 14 is used instead of the second optical coupler 5, and the multiplexed output light of the first and second optical modulation units 2 and 3 is demultiplexed into two. Among the demultiplexed light, one is output from the IQ optical demodulator M while the other is input to the photo detector 15. The output light of the first photo modulation unit 2 and that of the second photo modulation unit 3 interfere with each other inside the optical multiplexing/demultiplexing coupler 14, however the interference intensities of the output light of the IQ optical modulator M and the input light to the photo detector 15 are inverted due to the asymmetry of an optical waveguide coupler. In other words, the input light to the photo detector 15 weakens when the output light of the IQ optical modulator M intensifies due to the interference, while the input light to the photo detector 15 intensifies when the output light of the IQ optical modulator M weakens due to the interference. For this reason, this embodiment requires the inversion of the positive and negative of the control signal compared with the first to third embodiments.

Fifth Embodiment

The above description mainly refers to a case in which two of the three types of bias voltages $V_{bias1}$ to $V_{bias3}$ are kept at ideal voltages and the rest bias voltage starts drifting. For example, in FIG. 5, Equation 15 is derived in a state in which a drift occurs in only $V_{bias1}$ and the other two types of bias voltages are set at optimum values.

However, since it is hard to immediately set the three types of bias voltages $V_{bias1}$ to $V_{bias3}$ at optimum values at the starting operation of a commercial transmitter, there is a likelihood of all the three types of bias voltages greatly deviating from ideal values.

A commercial transmitter is required to have a bias voltage control algorithm by which all the three types of bias voltages are accurately converged into optimum values even if the transmitter starts from such an initial state. A fifth embodiment refers to such an algorithm. For simplicity, the fifth embodiment exemplifies the control of a transmitter that generates an optical QAM signal in which an order is the square of an even number n and a constellation has an n×n lattice pattern.

First, a variable is defined as follows. It is assumed that in a state in which dithering is not applied immediately after the start of the transmitter, the difference between the value of $V_{bias1}$ and an optimum value is $V_{d1}$ and the difference between the value of $V_{bias2}$ and an optimum value is $V_{d2}$. Since $V_{bias3}$ is not also limited to an optimum value immediately after the start of the transmitter, $\theta_3$ is not limited to $\pm\pi/2$ in the following Equation.

It is assumed that the voltages of dithering signals superposed on $V_{bias1}$ and $V_{bias2}$ are expressed as $A_d \cos(\omega_d t)$ and $A_d \sin(\omega_d t)$, respectively. Here, $A_d$ expresses a dither amplitude, and t expresses the time. The optical power $P_{total}$ of the QAM signal of an order $n^2$ slightly fluctuates depending on $\omega_d t$ as described above, however the optical power under $\omega_d t = \phi$ is expressed here as $P_{total}(\phi)$ in order to correctly express the slight fluctuation.

When Equation 12 is rewritten from a case in which only $V_{bias1}$ deviates from an ideal value to a case in which all the three types of bias voltages deviate from ideal values, Equation 19 is obtained.

$$P_{total}(\varphi) = n \sum_{L=0}^{n/2-1} \sin^2\left(\frac{V_L + \delta_1(\varphi)}{V_\pi}\frac{\pi}{2}\right) + \quad \text{(Equation 19)}$$

$$n \sum_{L=0}^{n/2-1} \sin^2\left(\frac{V_L - \delta_1(\varphi)}{V_\pi}\frac{\pi}{2}\right) + n \sum_{M=0}^{n/2-1} \sin^2\left(\frac{V_M + \delta_2(\varphi)}{V_\pi}\frac{\pi}{2}\right) +$$

$$n \sum_{M=0}^{n/2-1} \sin^2\left(\frac{V_M - \delta_2(\varphi)}{V_\pi}\frac{\pi}{2}\right) + 2\cos\theta_3$$

$$\sum_{L=0}^{n/2-1} \sum_{M=0}^{n/2-1} \left[ \begin{array}{c} \left\{\sin\left(\frac{V_L + \delta_1(\varphi)}{V_\pi}\frac{\pi}{2}\right) + \sin\left(\frac{-V_L + \delta_1(\varphi)}{V_\pi}\frac{\pi}{2}\right)\right\} \times \\ \left\{\sin\left(\frac{V_M + \delta_2(\varphi)}{V_\pi}\frac{\pi}{2}\right) + \sin\left(\frac{-V_M + \delta_2(\varphi)}{V_\pi}\frac{\pi}{2}\right)\right\} \end{array} \right]$$

However, $\delta_1(\phi)$ and $\delta_2(\phi)$ are expressed by Equations 20 and 21, respectively.

$$\delta_1(\phi) = V_{d1} + A_d \cos\phi \quad \text{(Equation 20)}$$

$$\delta_2(\phi) = V_{d2} + A_d \sin\phi \quad \text{(Equation 21)}$$

When $P_{total}(\pi) - P_{total}(0)$ is calculated to obtain the approximate value of the output of the first synchronous detection circuit 84 described in the first embodiment, Equation 22 is obtained.

$$P_{total}(\pi) - P_{total}(0) = \quad \text{(Equation 22)}$$

$$-2n\sin\left(\frac{A_d}{V_\pi}\pi\right)\sin\left(\frac{V_{d1}}{V_\pi}\pi\right)\sum_{L=0}^{n/2-1}\cos\left(\frac{V_L}{V_\pi}\pi\right) -$$

$$16\cos\theta_3 \sin\left(\frac{A_d}{V_\pi}\frac{\pi}{2}\right)\cos\left(\frac{V_{d1}}{V_\pi}\frac{\pi}{2}\right)\sin\left(\frac{V_{d2}}{V_\pi}\frac{\pi}{2}\right) \times$$

$$\sum_{L=0}^{n/2-1}\sum_{M=0}^{n/2-1}\cos\left(\frac{V_L}{V_\pi}\frac{\pi}{2}\right)\cos\left(\frac{V_M}{V_\pi}\frac{\pi}{2}\right)$$

In addition, when $P_{total}(3\pi/2) - P_{total}(\pi/2)$ is calculated to obtain the approximate value of the output of the second synchronous detection circuit 94 described in the first embodiment, Equation 23 is obtained.

$$P_{total}(3\pi/2) - P_{total}(\pi/2) = \quad \text{(Equation 23)}$$

$$-2n\sin\left(\frac{A_d}{V_\pi}\pi\right)\sin\left(\frac{V_{d2}}{V_\pi}\pi\right)\sum_{M=0}^{n/2-1}\cos\left(\frac{V_M}{V_\pi}\pi\right) -$$

$$16\cos\theta_3 \sin\left(\frac{A_d}{V_\pi}\frac{\pi}{2}\right)\cos\left(\frac{V_{d2}}{V_\pi}\frac{\pi}{2}\right)\sin\left(\frac{V_{d1}}{V_\pi}\frac{\pi}{2}\right) \times$$

$$\sum_{L=0}^{n/2-1}\sum_{M=0}^{n/2-1}\cos\left(\frac{V_L}{V_\pi}\frac{\pi}{2}\right)\cos\left(\frac{V_M}{V_\pi}\frac{\pi}{2}\right)$$

If all of $V_{bias1}$ to $V_{bias3}$ are optimum, $\theta_3 = \pm\pi/2$ and $V_{d1} = V_{d2} = 0$ are established and thus values obtained from Equations 22 and 23 are 0. If only $V_{bias3}$ is optimum and $V_{bias1}$ and $V_{bias2}$ are inappropriate, the values obtained from Equations 22 and 23 depend on $V_{d1}$ or $V_{d2}$ and the positive and negative of Equations 22 and 23 is determined by the positive and negative of Equation 16. This result is a mathematical expression showing that optimum $V_{bias1}$ and $V_{bias2}$ can be achieved if $V_{bias1}$ and $V_{bias2}$ are changed such that the synchronous detection results of the first and second synchronous detection circuits 84 and 94 become 0 in the same manner as the feedback control of $V_{bias1}$ and $V_{bias2}$ in the first embodiment.

However, since the second terms on the right side of Equations 22 and 23 have any value other than 0 if all of $V_{bias1}$ to $V_{bias3}$ are inappropriate at the stating operation of the transmitter, $V_{bias1}$ and $V_{bias2}$ cannot be promptly converged into optimum values.

Here, all of $V_{bias1}$ to $V_{bias3}$ finally reach optimum values if $V_{bias1}$ to $V_{bias3}$ are successively corrected by the alternate use of the two circuits, i.e. the first and second synchronous detection circuits 84 and 94 that perform the feedback control of $V_{bias1}$ and $V_{bias2}$ in the first embodiment, and the one circuit, i.e. the third synchronous detection circuit 103 that performs the feedback control of $V_{bias3}$, however it takes time to converge $V_{bias1}$ to $V_{bias3}$ into optimum values depending on their initial state.

In order to prevent this problem, it is required to first adjust $V_{bias3}$ to an optimum value and then adjust $V_{bias1}$ and $V_{bias2}$ to optimum values at the starting operation of the transmitter or it is required to first adjust $V_{bias3}$ to a value close to an optimum value and then adjust $V_{bias3}$ to a final optimum value while adjusting $V_{bias1}$ and $V_{bias2}$ to optimum values.

When $P_{total}(7\pi/4)+P_{total}(3\pi/4)-P_{total}(5\pi/4)-P_{total}(\pi/4)$ is calculated to obtain the approximate value of the output of the third synchronous detection circuit 103, Equation 24 is obtained.

$$P_{total}(7\pi/4) + P_{total}(3\pi/4) - P_{total}(5\pi/4) - P_{total}(\pi/4) = \quad \text{(Equation 24)}$$

$$-32\cos\theta_3\sin^2\left(\frac{A_d/\sqrt{2}}{V_\pi}\frac{\pi}{2}\right)\cos\left(\frac{V_{d1}}{V_\pi}\frac{\pi}{2}\right)$$

$$\cos\left(\frac{V_{d2}}{V_\pi}\frac{\pi}{2}\right) \times \sum_{L=0}^{n/2-1}\sum_{M=0}^{n/2-1}\cos\left(\frac{V_L}{V_\pi}\frac{\pi}{2}\right)\cos\left(\frac{V_M}{V_\pi}\frac{\pi}{2}\right)$$

From Equation 24, the following three conclusions (1) to (3) can be obtained.

(1) If $V_{bias1}$ and $V_{bias2}$ are values close to optimum values and $V_{d1}$ and $V_{d2}$ are close to 0, the value obtained from Equation 24 becomes 0 on the condition that $V_{bias3}$ is an optimum value and $\theta_3=\pm\pi/2$ is satisfied. This result is a mathematical expression showing that optimum $V_{bias3}$ can be achieved if $V_{bias3}$ is changed such that the synchronous detection result of the third synchronous detection circuit 103 becomes 0 in the same manner as the feedback of $V_{bias3}$ in the first embodiment.

(2) However, in a case in which $V_{bias1}$ and $V_{bias2}$ greatly deviate from optimum values and $V_{d1}=\pm V_\pi$ or $V_{d2}=\pm V_\pi$ is satisfied, the value obtained from Equation 24 becomes 0 even if $V_{bias3}$ is not an optimum value and $\theta_3=\pm\pi/2$ is not satisfied.

(3) In a case in which $V_{d1}$ and $V_{d2}$ are forcibly swept in the range of $+V_\pi$ to $-V_\pi$ or in a greater range, the value obtained from Equation 24 during the forcible sweeping becomes 0 at all times on the condition that $V_{bias3}$ is an optimum value and $\theta_3=\pm\pi/2$ is satisfied.

Since a commercial signal is not sent and received at the starting operation of the commercial transmitter, there is no effect on services even if $V_{bias1}$ and $V_{bias2}$ are forcibly swept.

By repeatedly changing $V_{bias1}$ and $V_{bias2}$ in the range of $+V_\pi$ to $-V_\pi$ for several $V_{bias3}$ with $V_{bias3}$ kept at a constant value and searching for $V_{bias3}$ such that the synchronous detection result of the third synchronous detection circuit 103 becomes 0 or nearly 0 at all times during the sweeping period, it is possible to set $V_{bias3}$ at an optimum value or a value close to the optimum value.

If $V_{bias3}$ can be set at an optimum value or a value close to the optimum value, it is possible to promptly converge $V_{bias1}$ and $V_{bias2}$ into optimum values using the first and second synchronous detection circuits 84 and 94 in the same manner as the first to fourth embodiments.

Figure 15:
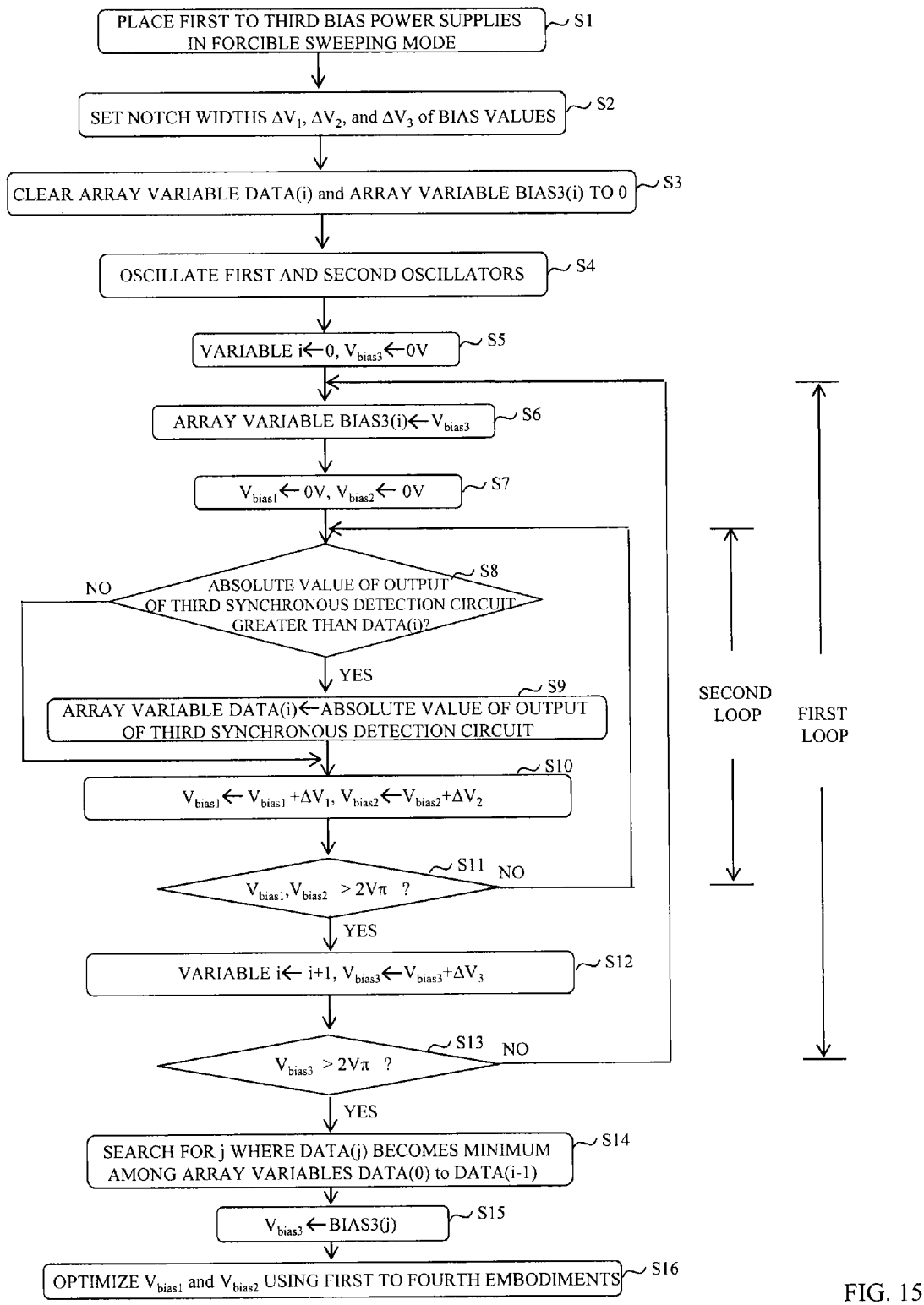
FIG. 15 is a flowchart showing processing at an initializing operation according to a fifth embodiment.

Hereinafter, a description will be given, with reference to the flowchart of FIG. 15, of processing at the initializing operation described above. This flow can be realized using, for example, a Field-Programmable Gate Array (FPGA).

First, the first bias power supply 8, the second bias power supply 9, and the third bias power supply 10 are placed in a forcible sweeping mode (step S1). Although these bias power supplies are controlled by the feedback signals output from the first, second, and third synchronous detection circuits 84, 94, and 103 in the feedback mode in the first to forth embodiments, they are set by a command output from a control circuit such as a FPGA in the forcible sweeping mode in the fifth embodiment.

Next, the notch widths $\Delta V_1$, $\Delta V_2$, $\Delta V_3$ of bias values are set (step S2). A bearing force against the circuit noises of the synchronous detection circuits becomes greater if these values are smaller, however it requires a long time to perform a starting operation if these values are too small. Each of $\Delta V_1$ to $\Delta V_3$ is set at a value smaller than twice the half wavelength voltages $V_\pi$ of $V_{bias1}$ to $V_{bias3}$.

Then, an array variable DATA(i) and an array variable BIAS3(i) are cleared to 0 (step S3), and the first and second oscillators 82 and 92 are oscillated (step S4). However, (i) expresses an array element. In addition, the unit of the array variable BIAS3(i) may be expressed not only by a voltage but also by an internal expression form used in the device. Before the start of a first loop, 0 is substituted into an integer type variable i and $V_{bias3}$ are set at 0 V (step S5).

In the first loop, first, $V_{bias3}$ is substituted into BIAS3(i) (step S6). Inside the first loop, a second loop is nested. Before the start of the second loop, $V_{bias1}$ and $V_{bias2}$ are set at 0 V (step S7).

In the second loop, first, the integer type variable i and $V_{bias3}$ are kept constant, the absolute values of the output of the third synchronous detection circuit 103 are checked one by one (step S8) while $V_{bias1}$ and $V_{bias2}$ are simultaneously increased at the notch widths $\Delta V_1$ and $\Delta V_2$ (step S10), and the largest one of the absolute values thus obtained is recorded on the DATA(i) (step S9). When $V_{bias1}$ and $V_{bias2}$ exceed $2V_\pi$, the procedure is released from the second loop (step S11).

When the second loop is released from the second loop, the integer type variable i is increased by 1 and $V_{bias3}$ is increased by the notch width $\Delta V_3$ (step S12) to close the first loop. When $V_{bias3}$ exceeds $2V_\pi$, the procedure is released from the first loop (step S13).

i types of synchronous detection results are substituted into DATA(0) to DATA(i−1) when the first loop is ended, however a synchronous detection result with the smallest value is searched (step S14). If DATA(j) is the one with the smallest value, the voltage value expressed by BIAS3(j) is the closest to the optimum value of $V_{bias3}$ or the optimum value in a swept range and thus $V_{bias3}$ is set at the voltage value indicated by BIAS3(j) to end the initializing operation (step S15).

After the end of the initializing operation, $V_{bias1}$ and $V_{bias2}$ are optimized by the configurations described in the first to fourth embodiments to end the optimizing operation (step S16).

Effect of the Present Disclosure

The optical modulation device and the bias voltage control method according to the present disclosure can be effectively applied to a case in which a multi-QAM signal is sent, particularly to a case in which a quaternary or larger value QAM signal is sent.

REFERENCE SIGNS LIST

M: IQ optical modulator
1: First optical coupler
2: First optical modulation unit
3: Second optical modulation unit
4: Optical phase shifter
5: Second optical coupler
6: First driving amplifier
7: Second driving amplifier
8: First bias power supply
9: Second bias power supply
10: Third bias power supply
11: Optical demultiplexing coupler
12: Optical power monitor
13: Controller
14: Optical multiplexing/demultiplexing coupler
15: Photo detector
61: First driving electrode
62: First amplitude adjustment unit
63: First pre-emphasis unit
71: Second driving electrode
72: Second amplitude adjustment unit
73: Second pre-emphasis unit
81: First bias electrode
82: First oscillator
83: First adder
84: First synchronous detection circuit
85: First dithering amplifier
91: Second bias electrode
92: Second oscillator
93: Second adder
94: Second synchronous detection circuit
95: Second dithering amplifier
101: Orthogonal bias electrode
102: Third oscillator
103: Third synchronous detection circuit
151: Optical power monitor terminal

The invention claimed is:

1. An optical modulation device, comprising:
an I-component optical modulation unit that modulates a continuous optical signal for an I-component of a QAM signal;
a Q-component optical modulation unit that modulates a continuous optical signal for a Q-component of the QAM signal;
a phase shift unit that shifts a phase of an optical signal on an input side and/or an output side for the I-component optical modulation unit and/or the Q-component optical modulation unit to adjust a phase difference between an output of the I-component optical modulation unit and an output of the Q-component optical modulation unit after the phase shift to $\pi/2$;
a QAM signal generation unit that multiplexes the output of the I-component optical modulation unit and the output of the Q-component optical modulation unit after the phase shift to generate the QAM signal;
an I-component data signal output unit that outputs an I-component data signal to the I-component optical modulation unit to cause the I-component optical modulation unit to modulate a continuous optical signal using the I-component data signal;
a Q-component data signal output unit that outputs a Q-component data signal to the Q-component optical modulation unit to cause the Q-component optical modulation unit to modulate a continuous optical signal using the Q-component data signal;
an I-component bias voltage signal output unit that outputs a signal having an I-component bias voltage corresponding to a null point of the I-component optical modulation unit to the I-component optical modulation unit;
a Q-component bias voltage signal output unit that outputs a signal having a Q-component bias voltage corresponding to a null point of the Q-component optical modulation unit to the Q-component optical modulation unit;
an I-component bias voltage signal adjustment unit that:
determines whether an intensity of the QAM signal at a drift non-occurrence time where no drift occurs in the I-component bias voltage becomes larger or smaller than the intensity of the QAM signal at a drift occurrence time where a drift occurs in the I-component bias voltage,
adjusts the I-component bias voltage to maximize the intensity of the QAM signal when determining that the intensity of the QAM signal at the drift non-occurrence time becomes larger than the intensity of the QAM signal at the drift occurrence time, and
adjusts the I-component bias voltage to minimize the intensity of the QAM signal when determining that the intensity of the QAM signal at the drift non-occurrence time becomes smaller than the intensity of the QAM signal at the drift occurrence time; and
a Q-component bias voltage signal adjustment unit that:
determines whether the intensity of the QAM signal at a drift non-occurrence time where no drift occurs in the Q-component bias voltage becomes larger or smaller than the intensity of the QAM signal at a drift occurrence time where a drift occurs in the Q-component bias voltage,
adjusts the Q-component bias voltage to maximize the intensity of the QAM signal when determining that the intensity of the QAM signal at the drift non-occurrence time becomes larger than the intensity of the QAM signal at the drift occurrence time, and
adjusts the Q-component bias voltage to minimize the intensity of the QAM signal when determining that the intensity of the QAM signal at the drift non-occurrence time becomes smaller than the intensity of the QAM signal at the drift occurrence time.

2. The optical modulation device according to claim 1, further comprising:
an I-component calculation unit that calculates a value shown in Equation 25 when a voltage of the I-component data signal is $V_{mi}$ (where $m_i=0, 1, \ldots, n_i/2-1$ when a number of the I-component data signal level is $n_i$) and a half wavelength voltage of the I-component optical modulation unit is $V_{\pi i}$;

$$\sum_{m_i=0}^{n_i/2-1} \cos\left(\frac{V_{mi}}{V_{\pi i}}\pi\right); \qquad \text{(Equation 25)}$$

and
a Q-component calculation unit that calculates a value shown in Equation 26 when a voltage of the Q-component data signal is $V_{mq}$ (where $m_q=0, 1, \ldots, n_q/2-1$ when a number of the Q-component data signal level is $n_q$) and a half wavelength voltage of the Q-component optical modulation unit is $V_{\pi q}$, $$\sum_{m_q=0}^{n_q/2-1} \cos\left(\frac{V_{mq}}{V_{\pi q}}\pi\right) \quad \text{(Equation 26)}$$

wherein the I-component bias voltage signal adjustment unit:
  determines that the intensity of the QAM signal at the drift non-occurrence time becomes larger than the intensity of the QAM signal at the drift occurrence time when the value shown in Equation 25 and calculated by the I-component calculation unit is negative, and
  determines that the intensity of the QAM signal at the drift non-occurrence time becomes smaller than the intensity of the QAM signal at the drift occurrence time when the value shown in Equation 25 and calculated by the I-component calculation unit is positive, and wherein the Q-component bias voltage signal adjustment unit:
  determines that the intensity of the QAM signal at the drift non-occurrence time becomes larger than the intensity of the QAM signal at the drift occurrence time when the value shown in Equation 26 and calculated by the Q-component calculation unit is negative, and
  determines that the intensity of the QAM signal at the drift non-occurrence time becomes smaller than the intensity of the QAM signal at the drift occurrence time when the value shown in Equation 26 and calculated by the Q-component calculation unit is positive.

3. The optical modulation device according to claim 1, further comprising:
  an I-component data signal voltage adjustment unit that adjusts, when the I-component bias voltage signal adjustment unit determines that the intensity of the QAM signal at the drift non-occurrence time becomes equal to the intensity of the QAM signal at the drift occurrence time, the voltage of the I-component data signal such that the I-component bias voltage signal adjustment unit determines that the intensity of the QAM signal at the drift non-occurrence time does not become equal to the intensity of the QAM signal at the drift occurrence time; and
  a Q-component data signal voltage adjustment unit that adjusts, when the Q-component bias voltage signal adjustment unit determines that the intensity of the QAM signal at the drift non-occurrence time becomes equal to the intensity of the QAM signal at the drift occurrence time, the voltage of the Q-component data signal such that the Q-component bias voltage signal adjustment unit determines that the intensity of the QAM signal at the drift non-occurrence time does not become equal to the intensity of the QAM signal at the drift occurrence time.

4. The optical modulation device according to claim 1, further comprising:
  an I-component dither voltage signal output unit that outputs a signal, which is superposed on the signal having the I-component bias voltage and has an I-component dither voltage having a frequency $\omega_d$, to the I-component optical modulation unit; and
  a Q-component dither voltage signal output unit that outputs a signal, which is superposed on the signal having the Q-component bias voltage and has a Q-component dither voltage having a phase difference $\pi/2$ between the frequency $\omega_d$ and the I-component dither voltage, to the Q-component optical modulation unit, wherein
  the I-component bias voltage signal adjustment unit performs synchronous detection of the QAM signal with the signal having the I-component dither voltage and adjusts the I-component bias voltage such that a result of the synchronous detection becomes 0 to optimize the intensity of the QAM signal to an extreme value, and
  the Q-component bias voltage signal adjustment unit performs synchronous detection of the QAM signal with the signal having the Q-component dither voltage and adjusts the Q-component bias voltage such that a result of the synchronous detection becomes 0 to optimize the intensity of the QAM signal to an extreme value.

5. The optical modulation device according to claim 4, further comprising:
  a phase shift unit bias voltage signal output unit that outputs a signal having a phase shift unit bias voltage, which is used to adjust the phase difference between the output of the I-component optical modulation unit and the output of the Q-component optical modulation unit after the phase shift to $\pi/2$, to the phase shift unit; and
  a phase shift unit bias voltage signal adjustment unit that performs synchronous detection of the QAM signal with a signal having a frequency $2\omega_d$ twice the frequency $\omega_d$ and adjusts the phase shift unit bias voltage such that a result of the synchronous detection becomes 0 to adjust the phase difference between the output of the I-component optical modulation unit and the output of the Q-component optical modulation unit after the phase shift to $\pi/2$.

6. The optical modulation device according to claim 5, further comprising:
  an I-component bias voltage signal sweeping unit that sweeps the I-component bias voltage in a range of $2V_{\pi i}$ or larger at an initializing operation of the optical modulation device when the half wavelength voltage of the I-component optical modulation unit is $V_{\pi i}$;
  a Q-component bias voltage signal sweeping unit that sweeps the Q-component bias voltage in a range of $2V_{\pi q}$ or larger at the initializing operation of the optical modulation device when the half wavelength voltage of the Q-component optical modulation unit is $V_{\pi q}$;
  a phase shift unit bias voltage signal initialization unit that performs synchronous detection of the QAM signal with the signal having frequency $2\omega_d$ twice the frequency $\omega_d$ while causing the I-component bias voltage signal sweeping unit and the Q-component bias voltage signal sweeping unit to perform the sweeping operation at the initializing operation of the optical modulation device, and
  initializes the phase shift unit bias voltage such that a result of the synchronous detection becomes 0 or becomes the closest to 0 at all times in a range of the sweeping operation of I-component bias voltage signal sweeping unit and the Q-component bias voltage signal sweeping unit; and
  a post-initialization adjustment unit that causes the I-component bias voltage signal adjustment unit, the Q-component bias voltage signal adjustment unit, and the phase shift unit bias voltage signal adjustment unit to perform adjustment after the initialization of the phase shift unit bias voltage by the phase shift unit bias voltage signal initialization unit.

7. The optical modulation device according to claim 1, further comprising:
a controller unit that
stops the Q-component bias voltage signal adjustment unit when operating the I-component bias voltage signal adjustment unit, and
stops the I-component bias voltage signal adjustment unit when operating the Q-component bias voltage signal adjustment unit.

8. The optical modulation device according to claim 1, wherein:
a progression $\{V_{mi}\}$ becomes an arithmetic progression when the voltage of the I-component data signal is $V_{mi}$ (where $m_i$=0, 1, . . . , $n_i/2$−1 when the number of the I-component data signal level is $n_i$), and
a progression $\{V_{mq}\}$ becomes an arithmetic progression when the voltage of the Q-component data signal is $V_{mq}$ (where $m_q$=0, 1, . . . , $n_q/2$−1 when the number of the Q-component data signal level is $n_q$).

9. The optical modulation device according to claim 1, wherein:
a progression $\{\sin(V_{mi}/V_{\pi i}\times\pi/2)\}$ becomes an arithmetic progression when the voltage of the I-component data signal is $V_{mi}$ (where $m_i$=0, 1, . . . , $n_i/2$−1 when the number of the I-component data signal level is $n_i$) and the half wavelength voltage of the I-component optical modulation unit is $V_{\pi i}$, and
a progression $\{\sin(V_{mq}/V_{\pi q}\times\pi/2)\}$ becomes an arithmetic progression when the voltage of the Q-component data signal is $V_{mq}$ (where $m_q$=0, 1, . . . , $n_q/2$−1 when the number of the Q-component data signal level is $n_q$) and the half wavelength voltage of the Q-component optical modulation unit is $V_{\pi q}$.

10. An optical modulation device that generates a QAM signal whose order is set to be constant, the device comprising:
an I-component optical modulation unit that modulates a continuous optical signal for an I-component of the QAM signal;
a Q-component optical modulation unit that modulates a continuous optical signal for a Q-component of the QAM signal;
a phase shift unit that shifts a phase of an optical signal on an input side and/or an output side for the I-component optical modulation unit and/or the Q-component optical modulation unit to adjust a phase difference between an output of the I-component optical modulation unit and an output of the Q-component optical modulation unit after the phase shift to π/2;
a QAM signal generation unit that multiplexes the output of the I-component optical modulation unit and the output of the Q-component optical modulation unit after the phase shift to generate the QAM signal;
an I-component data signal output unit that outputs an I-component data signal whose amplitude is controlled to be constant to the I-component optical modulation unit to cause the I-component optical modulation unit to modulate a continuous optical signal using the I-component data signal;
a Q-component data signal output unit that outputs a Q-component data signal whose amplitude is controlled to be constant to the Q-component optical modulation unit to cause the Q-component optical modulation unit to modulate a continuous optical signal using the Q-component data signal;
an I-component bias voltage signal output unit that outputs a signal having an I-component bias voltage corresponding to a null point of the I-component optical modulation unit to the I-component optical modulation unit;
a Q-component bias voltage signal output unit that outputs a signal having a Q-component bias voltage corresponding to a null point of the Q-component optical modulation unit to the Q-component optical modulation unit;
an I-component bias voltage signal adjustment unit that maximizes or minimizes an intensity of the QAM signal to adjust the I-component bias voltage to an optimum value; and
a Q-component bias voltage signal adjustment unit that maximizes or minimizes the intensity of the QAM signal to adjust the Q-component bias voltage to an optimum value.

11. The optical modulation device according to claim 10, wherein
$V_{mi}$ is a constant at all times when a voltage of the I-component data signal is $V_{mi}$ (where $m_i$=0, 1, . . . , $n_i/2$−1 when a number of the I-component data signal level is $n_i$),
$V_{mq}$ is a constant at all times when a voltage of the Q-component data signal is $V_{mq}$ (where $m_q$=0, 1, . . . , $n_q/2$−1 when a number of the Q-component data signal level is $n_q$),
the I-component bias voltage signal adjustment unit:
adjusts the I-component bias voltage to maximize the intensity of the QAM signal at all times when a constant set by Equation 27 is negative, and
adjusts the I-component bias voltage to minimize the intensity of the QAM signal at all times when the constant set by Equation 27 is positive, $$\sum_{m_i=0}^{n_i/2-1} \cos\left(\frac{V_{mi}}{V_{\pi i}}\pi\right), \quad \text{(Equation 27)}$$

and wherein
the Q-component bias voltage signal adjustment unit:
adjusts the Q-component bias voltage to maximize the intensity of the QAM signal at all times when a constant set by Equation 28 is negative, and
adjusts the Q-component bias voltage to minimize the intensity of the QAM signal at all times when the constant set by Equation 28 is positive, $$\sum_{m_q=0}^{n_q/2-1} \cos\left(\frac{V_{mq}}{V_{\pi q}}\pi\right). \quad \text{(Equation 28)}$$

12. A bias voltage control method, comprising:
I and Q component optical modulation steps of modulating continuous optical signals for I and Q components of a QAM signal;
a phase shift step of shifting a phase of an optical signal on an input side and/or an output side for the I-component optical modulation step and/or the Q-component optical modulation step and adjusting a phase difference between an output of the I-component optical modulation step and an output of the Q-component optical modulation step after the phase shift to π/2; and a QAM signal generation step of multiplexing the output of the I-component optical modulation step and the output of the Q-component optical modulation step after the phase shift to generate the QAM signal, wherein the I-component optical modulation step sequentially includes
an I-component signal input step of
inputting an I-component data signal used to modulate a continuous modulation signal, and
inputting a signal having an I-component bias voltage corresponding to a null point of the I-component optical modulation step, and
an I-component bias voltage signal adjustment step of:
determining whether an intensity of the QAM signal at a drift non-occurrence time where no drift occurs in the I-component bias voltage becomes larger or smaller than the intensity of the QAM signal at a drift occurrence time where a drift occurs in the I-component bias voltage,
adjusting the I-component bias voltage to maximize the intensity of the QAM signal when determining that the intensity of the QAM signal at the drift non-occurrence time becomes larger than the intensity of the QAM signal at the drift occurrence time, and
adjusting the I-component bias voltage to minimize the intensity of the QAM signal when determining that the intensity of the QAM signal at the drift non-occurrence time becomes smaller than the intensity of the QAM signal at the drift occurrence time, and wherein the Q-component optical modulation step sequentially includes:
a Q-component signal input step of
inputting a Q-component data signal used to modulate a continuous modulation signal, and
inputting a signal having a Q-component bias voltage corresponding to a null point of the Q-component optical modulation step, and
a Q-component bias voltage signal adjustment step of:
determining whether the intensity of the QAM signal at a drift non-occurrence time where no drift occurs in the Q-component bias voltage becomes larger or smaller than the intensity of the QAM signal at a drift occurrence time where a drift occurs in the Q-component bias voltage,
adjusting the Q-component bias voltage to maximize the intensity of the QAM signal when determining that the intensity of the QAM signal at the drift non-occurrence time becomes larger than the intensity of the QAM signal at the drift occurrence time, and
adjusting the Q-component bias voltage to minimize the intensity of the QAM signal when determining that the intensity of the QAM signal at the drift non-occurrence time becomes smaller than the intensity of the QAM signal at the drift occurrence time.

* * * * *